(12) United States Patent
Kang et al.

(10) Patent No.: US 9,436,290 B2
(45) Date of Patent: Sep. 6, 2016

(54) DISPLAY DEVICE AND OPERATING METHOD THEREOF

(71) Applicant: LG ELECTRONICS INC., Seoul (KR)

(72) Inventors: Sangkyu Kang, Seoul (KR); Wooseok Ahn, Seoul (KR); Eunyul Lee, Seoul (KR); Sewon Park, Seoul (KR); Dongheon Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 24 days.

(21) Appl. No.: 14/457,951

(22) Filed: Aug. 12, 2014

(65) Prior Publication Data

US 2015/0277573 A1 Oct. 1, 2015

Related U.S. Application Data

(60) Provisional application No. 61/970,923, filed on Mar. 27, 2014.

(30) Foreign Application Priority Data

Apr. 11, 2014 (KR) .......................... 10-2014-0043359
Apr. 29, 2014 (KR) .......................... 10-2014-0051318

(51) Int. Cl.
*G06F 3/01* (2006.01)
*G06K 9/00* (2006.01)

(52) U.S. Cl.
CPC ........... *G06F 3/017* (2013.01); *G06K 9/00355* (2013.01)

(58) Field of Classification Search
None
See application file for complete search history.

(56) References Cited

U.S. PATENT DOCUMENTS

| | | | |
|---|---|---|---|
| 2007/0177803 A1* | 8/2007 | Elias | ................... G06F 3/04883 382/188 |
| 2008/0163130 A1* | 7/2008 | Westerman | ......... G06F 3/04883 715/863 |
| 2008/0244467 A1* | 10/2008 | Kim | ...................... G06F 3/0346 715/863 |
| 2010/0058252 A1* | 3/2010 | Ko | ...................... G06F 3/04883 715/863 |
| 2011/0093821 A1 | 4/2011 | Wigdor et al. | |
| 2013/0050458 A1 | 2/2013 | Kim et al. | |
| 2013/0278493 A1* | 10/2013 | Wei | .................... G06K 9/00355 345/156 |

FOREIGN PATENT DOCUMENTS

EP 2 400 371 A2 12/2011
EP 2 660 681 A2 11/2013

* cited by examiner

*Primary Examiner* — Seokyun Moon
(74) *Attorney, Agent, or Firm* — Birch, Stewart, Kolasch & Birch, LLP

(57) ABSTRACT

A method of controlling a display device, and which includes obtaining, via camera of the display device, a user's image; recognizing, via a controller of the display device, a user's hand gesture from the obtained user's image; and when the recognized user's hand gesture does not match a pre-stored gesture, displaying, via a display of the display device, a function guide including different hand gestures different than the recognized user's hand gesture for guiding a user's selection for performing a function of the display device.

20 Claims, 36 Drawing Sheets

Copy　　　　Play　　　　Delete　　　　Move

FIG.5
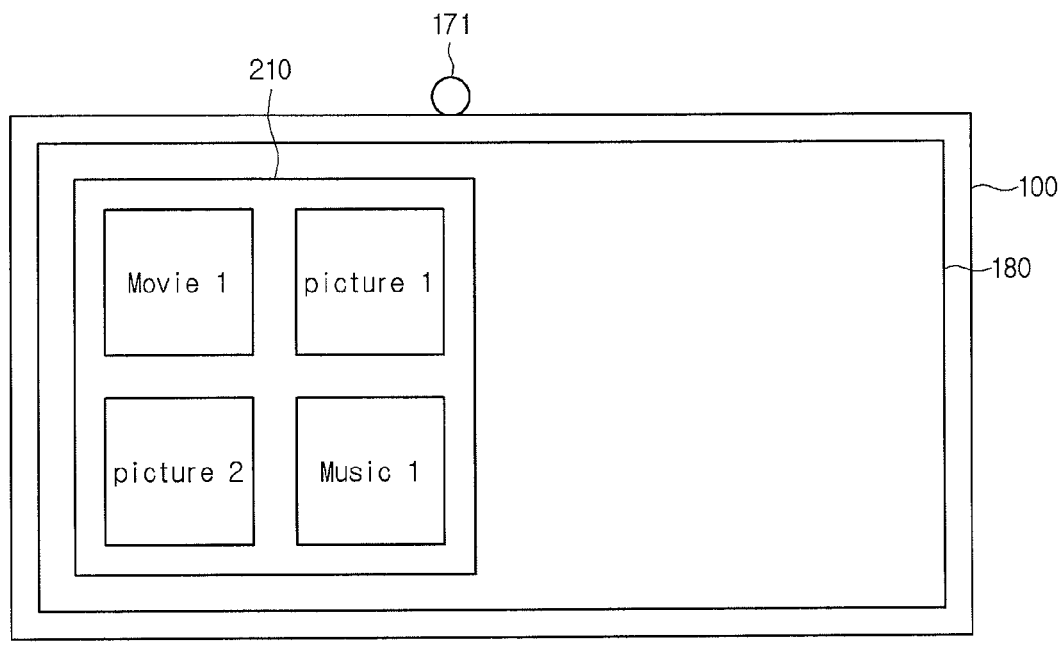
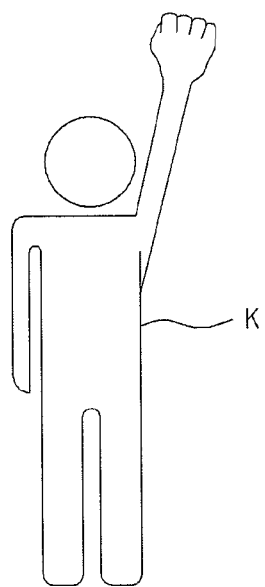

FIG.11
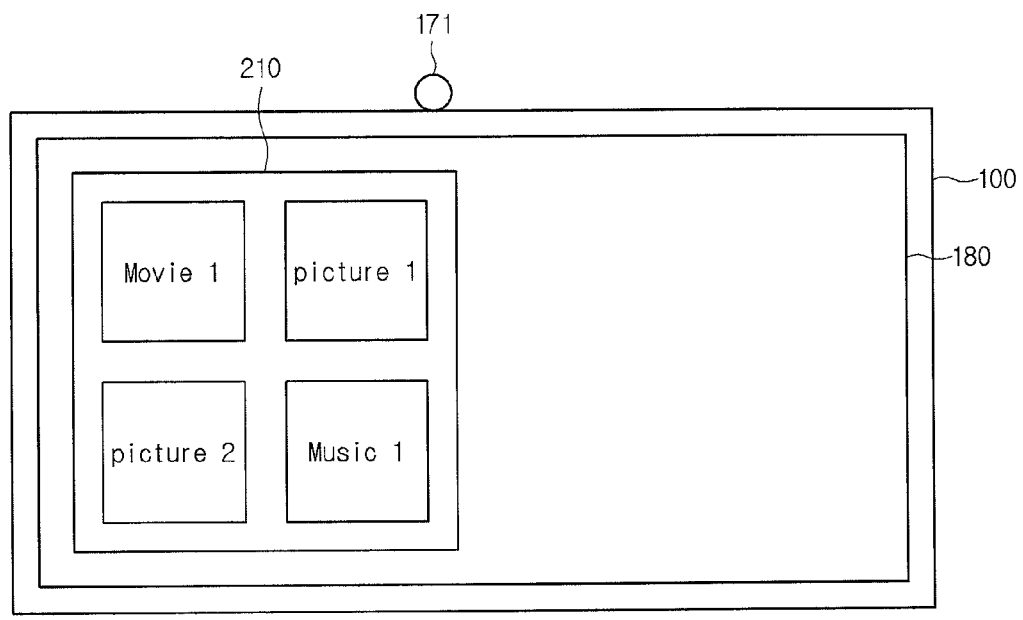
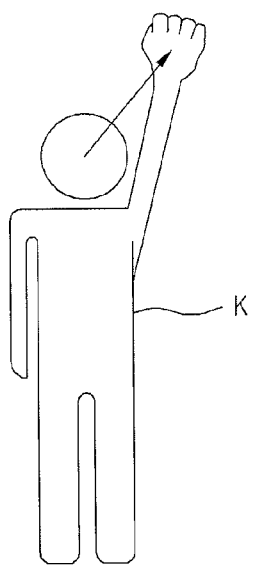

FIG.13
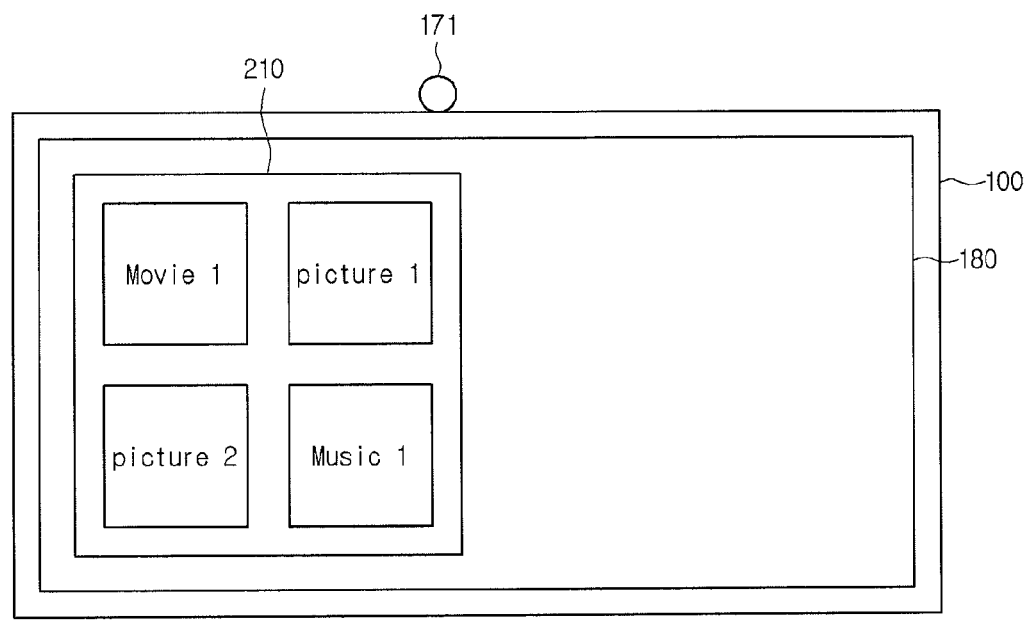
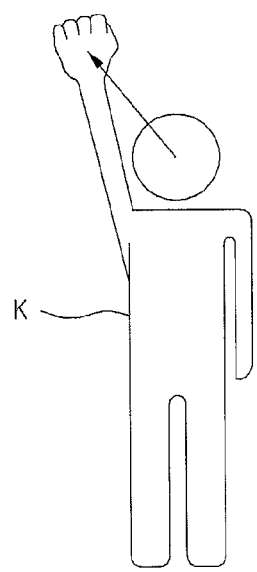

FIG.19
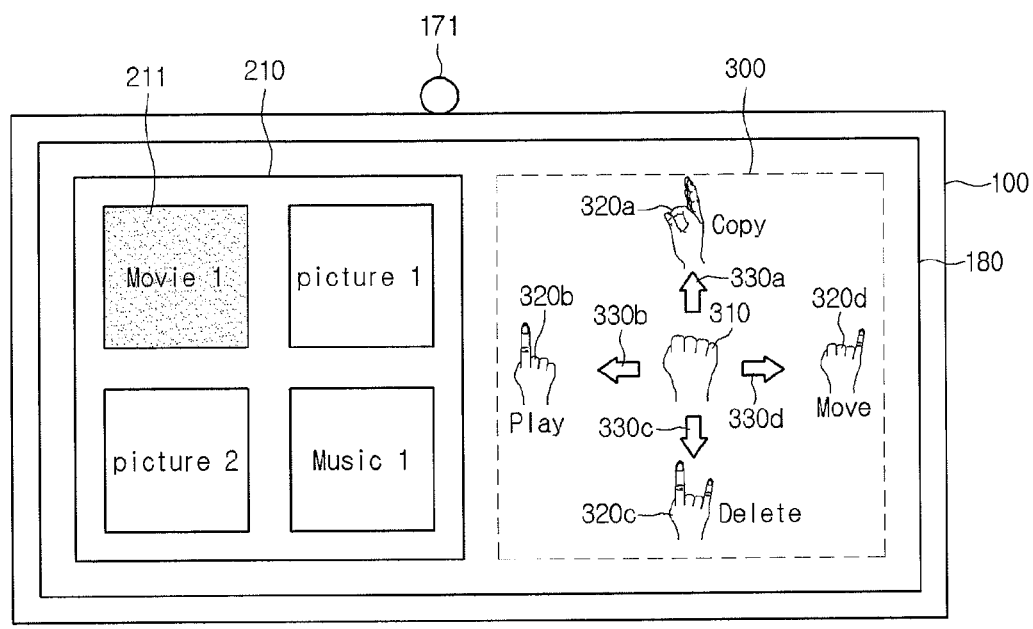
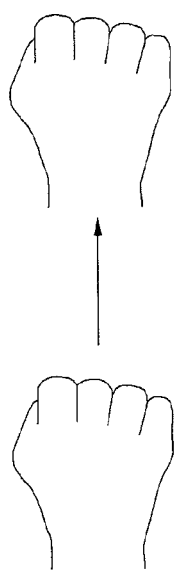

FIG.21
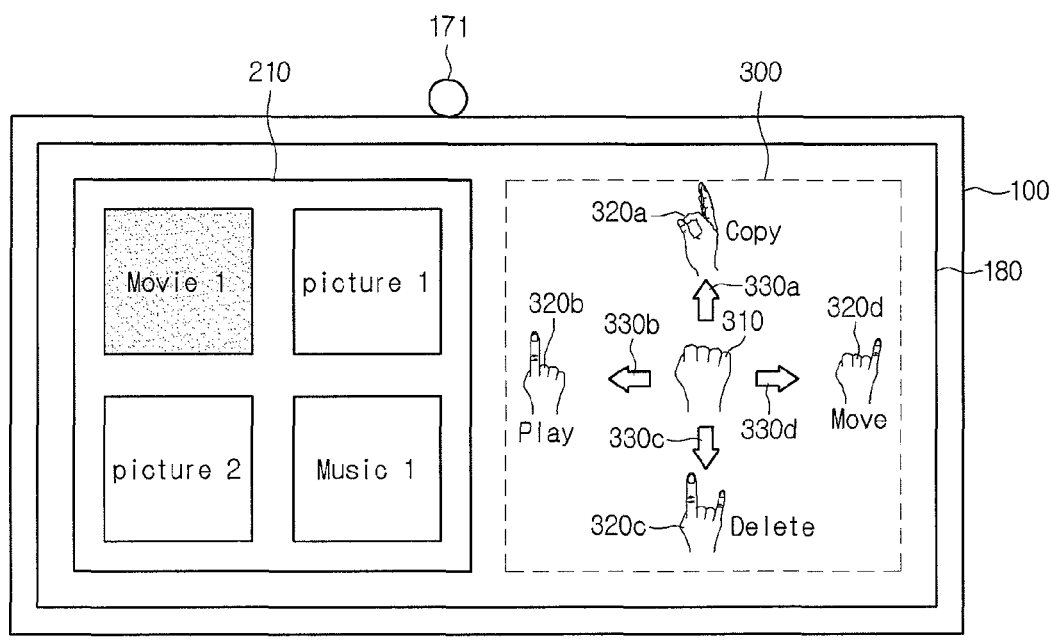
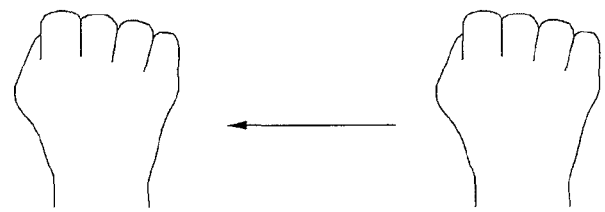

FIG.23
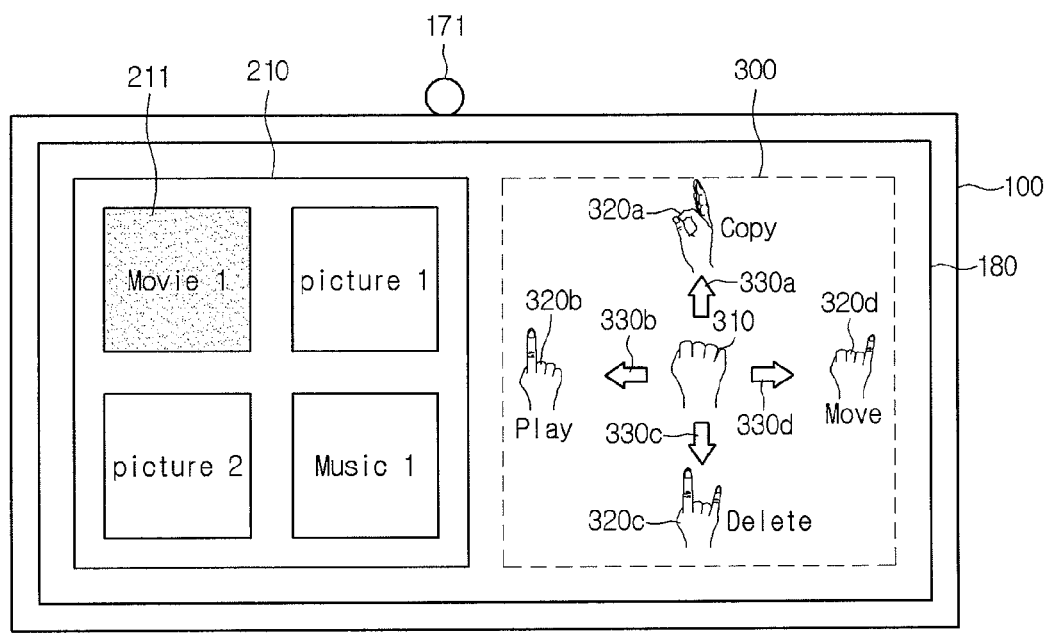
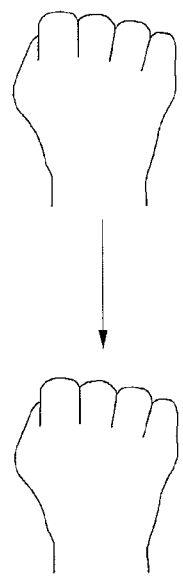

FIG.25
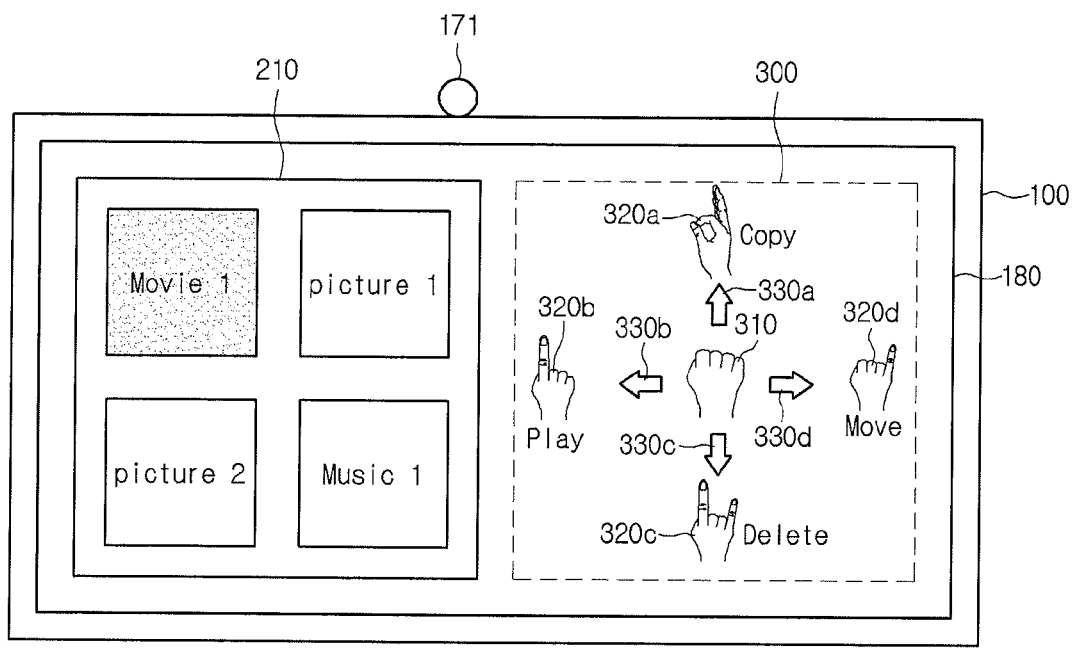
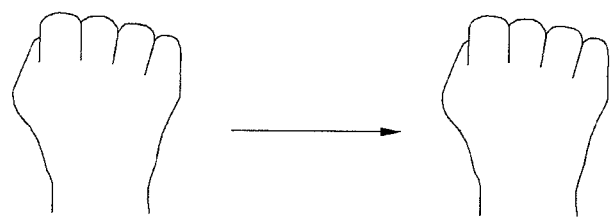

FIG.28
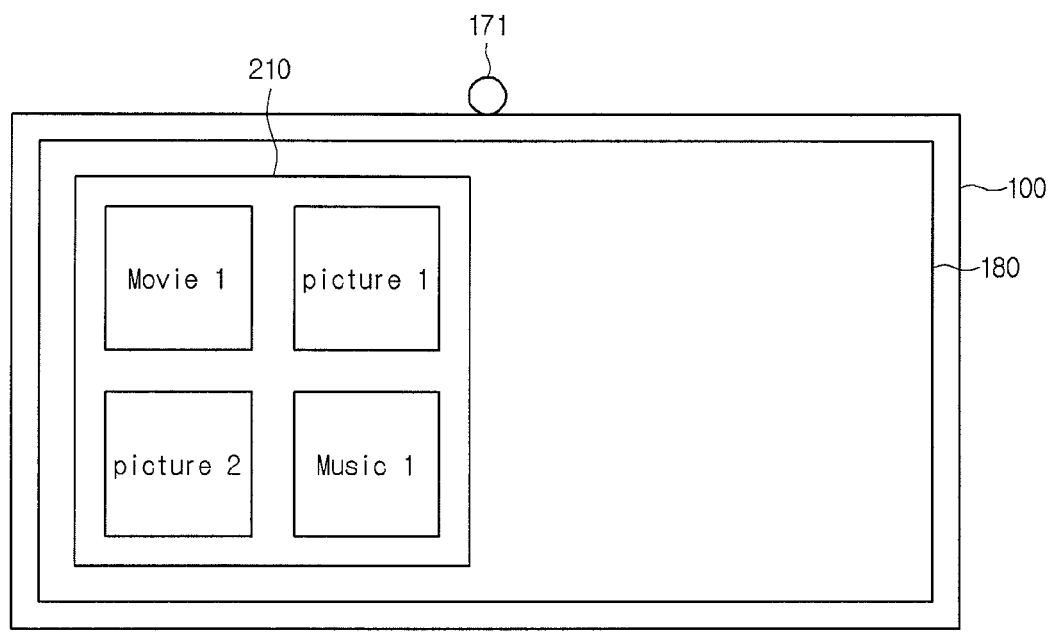
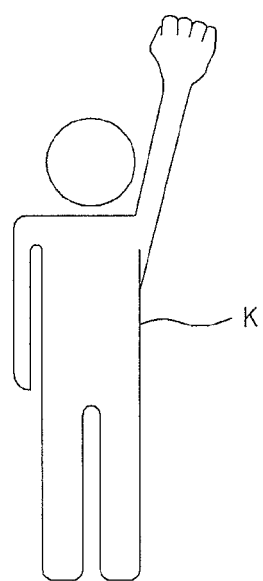

FIG.32
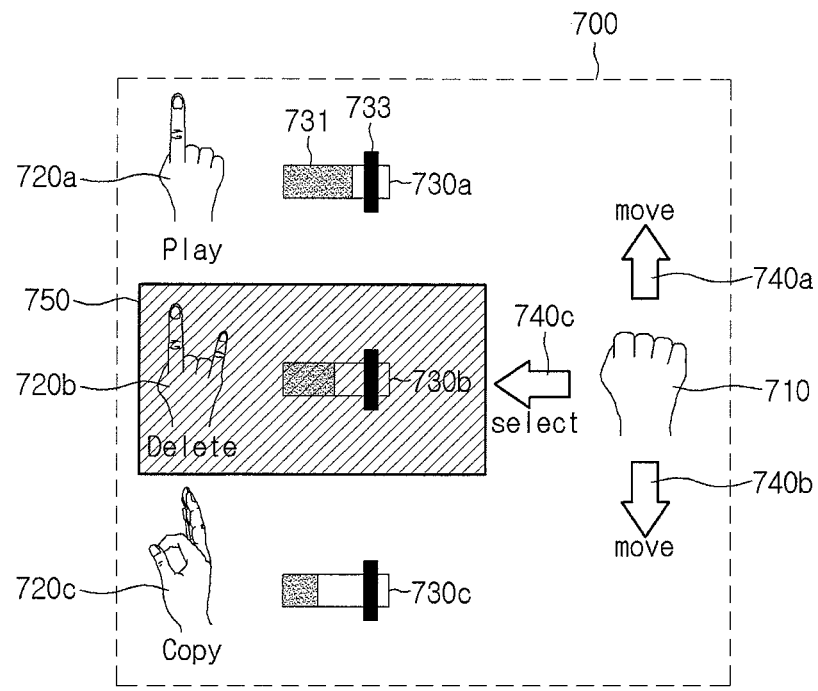
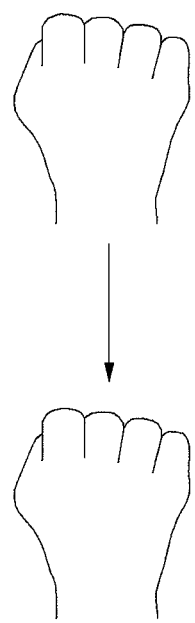

FIG.33
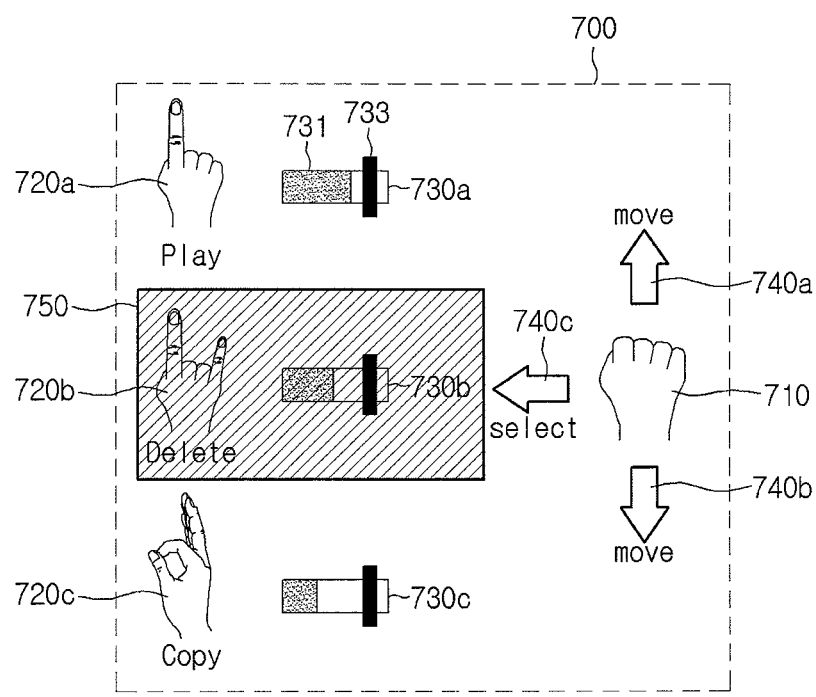
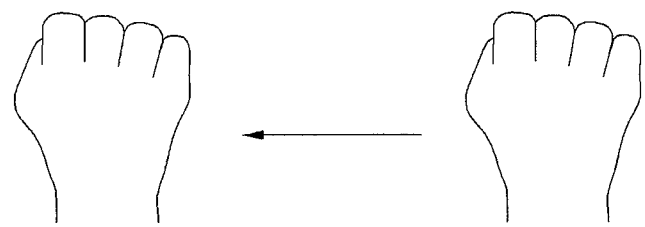

DISPLAY DEVICE AND OPERATING METHOD THEREOF

CROSS REFERENCE TO A RELATED APPLICATION

This application claims the benefit of U.S. Provisional Application No. 61/970,923, filed on Mar. 27, 2014 entitled "METHOD FOR APPARATUS FOR GESTURED-BASED USER INTERFACE," Korean Patent Application No. 10-2014-0043359, filed on Apr. 11, 2014 entitled "DISPLAY DEVICE AND OPERATING METHOD THEREOF" and Korean Patent Application No. 10-2014-0051318, filed on Apr. 29, 2014 entitled "DISPLAY DEVICE AND OPERATING METHOD THEREOF," which is hereby incorporated by reference in its entirety into this application.

DISCUSSION OF THE BACKGROUND

1. Field of the Invention

The present invention relates to a display device and an operating method thereof.

2. Description of the Related Art

A digital TV service using a wired or wireless communication network provides various services that cannot be provided from an existing analog broadcast service. For example, internet protocol television service (IPTV), one type of the digital TV service, allows a user to actively select the type of viewing program and viewing time. The IPTV service can provide various enhanced services based on such an interaction, for example, internet search, home shopping, and online gaming.

Moreover, recent digital TVs recognize user's gestures and provide services performing functions corresponding to the recognized user's gestures. However, gesture instructions are complex and must be remembered or memorized by users, making it very inconvenient.

SUMMARY OF THE INVENTION

Accordingly, one embodiment of the present invention provides a display device and an operating method thereof allowing a user to perform a corresponding function without memorizing complex hand gesture patterns by providing a function guide displaying similar hand gestures and a function corresponding to each of the similar hand gestures.

Another embodiment provides a display device and an operating method thereof allowing a user to perform a corresponding function without memorizing complex hand gesture patterns by providing a function guide displaying basic hand gestures and a function corresponding to each of the basic hand gestures.

To achieve these and other advantages and in accordance with the purpose of the present invention, as embodied and broadly described herein, the present invention provides in one aspect a method of controlling a display device, the method including obtaining, via camera of the display device, a user's image; recognizing, via a controller of the display device, a user's hand gesture from the obtained user's image; and when the recognized user's hand gesture does not match a pre-stored gesture, displaying, via a display of the display device, a function guide including different hand gestures different than the recognized user's hand gesture for guiding a user's selection for performing a function of the display device.

In another aspect, the present invention provides a display device including a display; a memory configured to store gestures; a camera configured to obtain a user's image; and a controller configured to: recognize a user's hand gesture from the obtained user's image, and when the recognized user's hand gesture does not match a pre-stored gesture, display on the display a function guide including different hand gestures different than the recognized user's hand gesture for guiding a user's selection for performing a function of the display device.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 5 to 9 are views displaying a function guide when a recognized gesture is not a pre-registered gesture according to an embodiment of the present invention;

FIGS. 11 to 16 are views displaying a different function guide depending on which hand a recognized hand gesture represents according to an embodiment of the present invention;

FIGS. 19 to 26 are views illustrating a process for performing a corresponding function in correspondence to the selection of a specific gesture displayed in a function guide according to an embodiment of the present invention;

FIGS. 28 to 31 are views displaying a gesture setting guide when a recognized gesture is not a pre-stored gesture according to an embodiment of the present invention;

FIGS. 32 to 35 are views illustrating a procedure for registering a function of a display device in a recognized gesture according to an embodiment of the present invention;

DETAILED DESCRIPTION OF THE EMBODIMENTS

Hereinafter, embodiments of the present invention will be described in more detail with reference to the accompanying drawings. The suffixes "module" and "unit" for components used in the description below are assigned or mixed in consideration of easiness in writing the specification and, do not have distinctive meanings or roles by themselves.

A display device according to an embodiment of the present invention, for example, as an artificial display device adding a computer supporting function to a broadcast receiving function, can have an easy-to-use interface such as a handwriting type input device, a touch screen, or a spatial remote controller. Moreover, with the support of a wired or wireless internet function, the image display can perform a function such as e-mail, web browsing, internet banking, or online game by accessing internet or computers. A standardized general-purpose OS can be used for such various functions.

Accordingly, since various applications are added or deleted freely on a general-purpose OS kernel, a display device described in the present invention can perform user-friendly various functions. In more detail, the display device, for example, can be a network TV, an HBBTV, a smart TV, an LED TV, or an OLED TV, and if necessary, can be applied to a smartphone.

Figure 1:
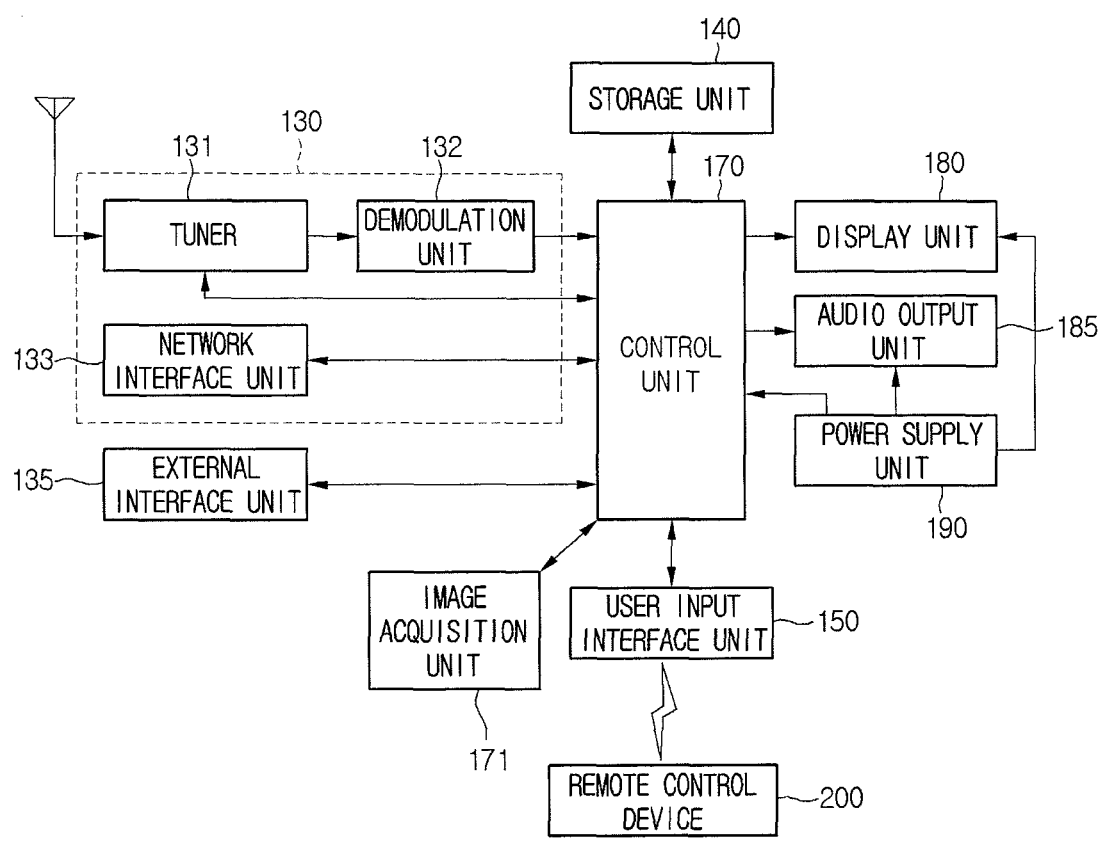
FIG. 1 is a block diagram illustrating a configuration of a display device according to an embodiment of the present invention.

FIG. 1 is a block diagram illustrating a configuration of a display device according to an embodiment of the present invention. Referring to FIG. 1, the display device 100 can include a broadcast reception unit 130, an external device interface unit 135, a storage unit 140, a user input interface unit 150, a control unit 170, an image acquisition unit 171, a display unit 180, an audio output unit 185, and a power supply unit 190. Moreover, the broadcast reception unit 130 can include a tuner 131, a demodulation unit 132, and a network interface 133.

The external device interface unit 135 can receive an application or an application list in an adjacent external device and can then deliver it to the control unit 170 or the storage unit 140. The network interface unit 133 can provide an interface to connect the display device 100 to a wired/wireless network including an internet network. The network interface unit 133 can transmit ore receive data to or from another user or another electronic device via an accessed network or another network linked to an accessed network.

Moreover, the network interface unit 133 can transmit part of contents data stored in the display device 100 to a selected user or a selected electronic device among pre-registered other users or other electronic devices. The network interface unit 133 can access a predetermined webpage via an accessed network or another network linked to an accessed network. That is, the network interface unit 1300 can transmit or receive data to or from a corresponding server by accessing a predetermined webpage via a network.

Then, the network interface unit 133 can receive contents or data provided from a contents provider or a network operator. That is, the network interface unit 133 can receive contents such as movies, advertisements, games, VOD, and broadcast signals provided from a contents provider or a network provider via a network and information relating thereto. Additionally, the network interface unit 133 can receive update information and update files of firmware provided from a network operator and can transmit data to an internet or contents provider or a network operator. The network interface unit 133 can select and receive a desired application among applications open to the public via a network.

The storage unit 140 can store a program for each signal processing and control in the control unit 170 and can store signal processed images, voices, or data signals. Additionally, the storage unit 140 can perform a function for temporarily storing images, voices or data signals input from the external device interface unit 135 or the network interface unit 133, and can store information on a predetermined image through a channel memory function. The storage unit 140 can store an application or an application list input from the external device interface unit 135 or the network interface unit 133.

The display device 100 can play a contents file (for example, a video file, a still image file, a music file, a document file, and an application file) stored in the storage unit 140 and can then provide it to a user.

Further, the user input interface unit 150 can deliver a signal that a user inputs to the control unit 170 or can deliver a signal from the control unit 170 to a user. For example, the user input interface unit 150 can receive and process a control signal for power on/off, channel selection, and screen setting from a remote control device 200 or can transmit a control signal from the control unit 170 to the remote control device 200 according to various communication methods such as Bluetooth, Ultra Wideband (WB), ZigBee, Radio Frequency (RF) and IR communication methods. Additionally, the user input interface unit 150 can deliver a control signal input from a local key (no shown) such as a power key, a channel key, a volume key, and a setting key to the control unit 170.

An image signal image-processed in the control unit 170 can also be input to the display unit 180 and can then be displayed as an image corresponding to a corresponding image signal. Additionally, an image signal image-processed in the control unit 170 can be input to an external output device through the external device interface unit 135. A voice signal processed in the control unit 170 can be output to the audio output unit 185. Additionally, a voice signal processed in the control unit 170 can be input to an external output device through the external device interface unit 135.

Besides that, the control unit 170 can control overall operations in the display device 100. Moreover, the control unit 170 can control the display device 100 through a user instruction input through the user input interface unit 150 or an internal program, or can download an application or an application list that a user wants into the image display device 100 by accessing a network.

The control unit 170 can allow both information on a channel that a user selects and processed image or voice to be output through the display unit 180 or the audio output unit 185. Moreover, the control unit 170 can allow image signals or voice signals input from an external device connected through the external device interface unit 135, for example, a camera or a camcorder, to be output through the display unit 180 or the audio output unit 185 in response to an external device image playback instruction received through the user input interface unit 150.

In addition, the control unit 170 can perform a control on the display unit 180 to display an image and for example, can perform a control to display on the display unit 180 a broadcast image input through the tuner 131, an external input image input through the external device interface unit 135, an image input through the network interface unit 133, or an image stored in the storage unit 140. In this instance, an image displayed on the display unit 180 can be a still image or a video, or can be a 2D image or a 3D image.

Additionally, the control unit 170 can perform a control to play contents stored in the display device 100, received broadcast contents, or external input contents input from the outside, and the contents can be in various forms, for example, a broadcast image, an external input image, an audio file, a still image, an accessed web screen, and a document file.

The image acquisition unit 171 can obtain a user's image. The image acquisition unit 171 can include a camera. The image acquisition unit 171 can include various devices capable of capturing an image and various sensor devices capable of detecting a subject, for example, digital cameras, CMOS cameras, charged coupled device (CCD) cameras, and TOF cameras.

According to an embodiment of the present invention, a camera can capture an image relating to a user's face and a hand's gesture such as a user's hand shape and motion and the control unit 170 can recognize a user's face and a user's hand motion through the captured image. The control unit 170 can distinguish a user's face area and a user's hand area from the captured user's image and for this, can extract the user's face area and the user's hand area by dividing a user's face color, a user's hand color, and a background color other than the user's face and hand. Additionally, the control unit 170 can recognize a user's face and a user's hand motion, for example, a hand's shape or movement, by using the extracted user's face area and user's hand area.

The display unit 180 can convert an image signal processed in the control unit 170, a data signal, an OSD signal, an image signal received from the external device interface unit 135, or a data signal into R, G, and B signals so as to generate a driving signal. Moreover, the display device 100 shown in FIG. 1 is just one embodiment, and thus some of the components shown in FIG. 1 can be integrated, added, or omitted according to the specification of the actually implemented display device 100. That is, at least two components can be integrated into one component or one component can be divided into more than two components, if necessary. Additionally, a function performed in each block is used to describe an embodiment of the present invention and its specific operation or device does not limit the scope of the present invention.

According to another embodiment of the present invention, unlike those shown in FIG. 1, the display device 100 can not include the tuner 131 and the demodulation unit 132 and can receive an image through the network interface unit 133 or the external device interface unit 1235 and can then play it. For example, the display device 100 can be divided into an image processing device such a set-top box for receiving broadcast signals or contents according to various networks and a contents playback device playing contents input from the image processing device.

In this instance, an operating method of a display device described below according to an embodiment of the present invention can be performed by one of the image processing device such as a separated set-top box or the contents playback device including the display unit 180 and the audio output unit 185 in addition to the display device 100 described with reference to FIG. 1.

Figure 2:
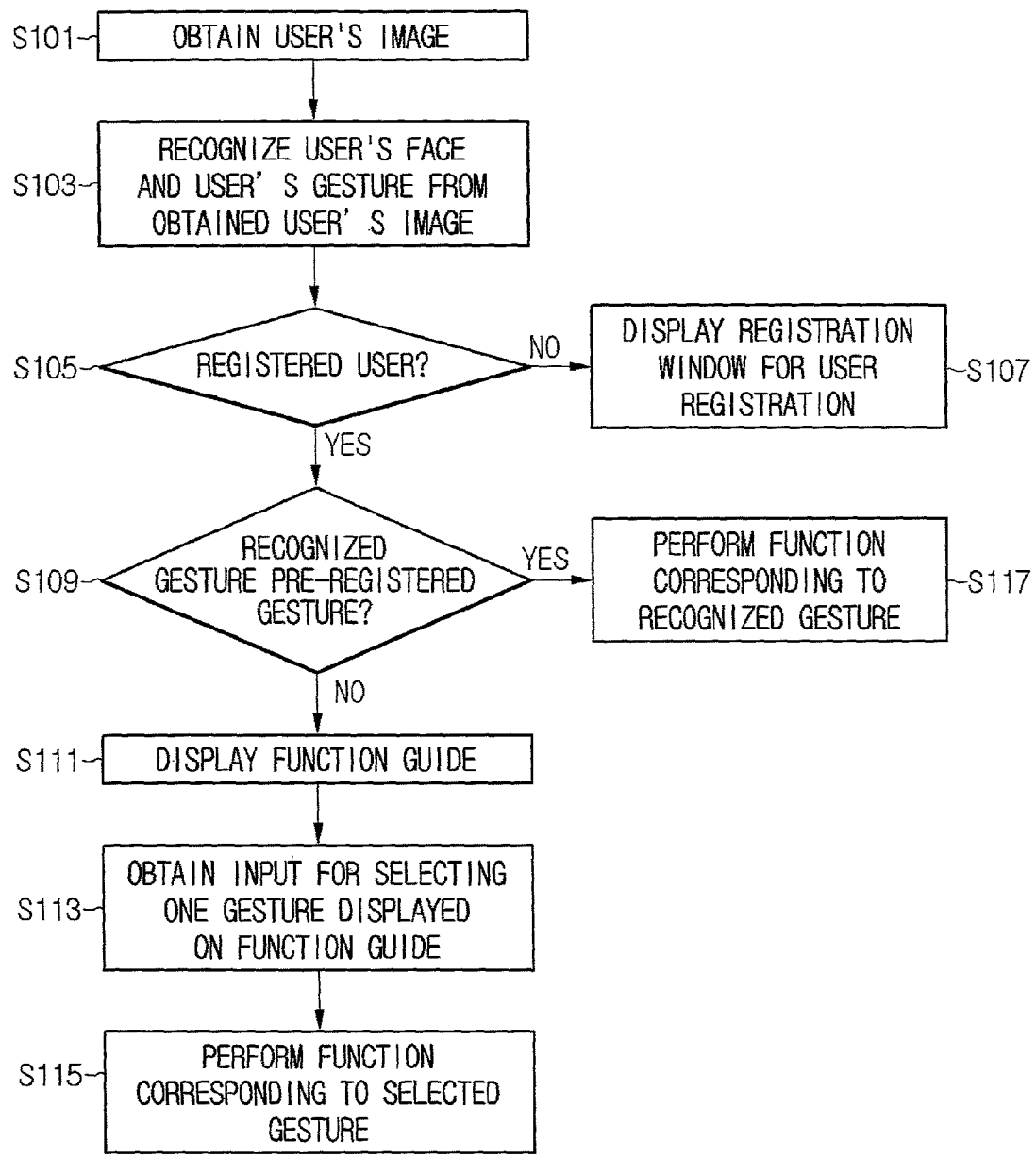
FIG. 2 is a flowchart illustrating an operating method of the display device according to an embodiment of the present invention will be described.

Next, FIG. 2 is a flowchart illustrating an operating method of the display device 100 according to an embodiment of the present invention will be described. As shown, the image acquisition unit 171 obtains a user's image (S101).

According to an embodiment, the image acquisition unit 171 can include a camera. The camera can capture the front of the display device 100 thereby obtaining a user's image disposed at the front of the display device 100. The camera can be disposed at the top of the display device 100 to capture a user's image but is not limited thereto and can be disposed at one of the left, right or bottom of the display device 100. Additionally, the camera can not be included in the display device 100 but can exist as an additional component.

The control unit 170 recognizes a user's face and a user's gesture from the obtained user's image (S103). The control unit 170 can recognize a user through the recognized user's face and user's gesture. Further, the control unit 170 can extract a user's face area and a user's hand area from the obtained user's image. The control unit 170 can also extract a user's face area and a user's hand area by dividing a user's face color, a user's hand color, and a background color other than the user's face and hand. Additionally, the control unit 170 can recognize a user's face and a user's hand motion, for example, a hand's shape or movement, by using the extracted user's face area and user's hand area.

A user's gesture may be a hand gesture corresponding to the user's hand area. A plurality of hand gestures may correspond to functions of the display device 100, respectively. That is, the control unit 170 can recognize one hand gesture among the plurality of hand gestures and can perform a function corresponding to the recognized hand gesture. This will be described with reference to FIG. 3.

Figure 3:
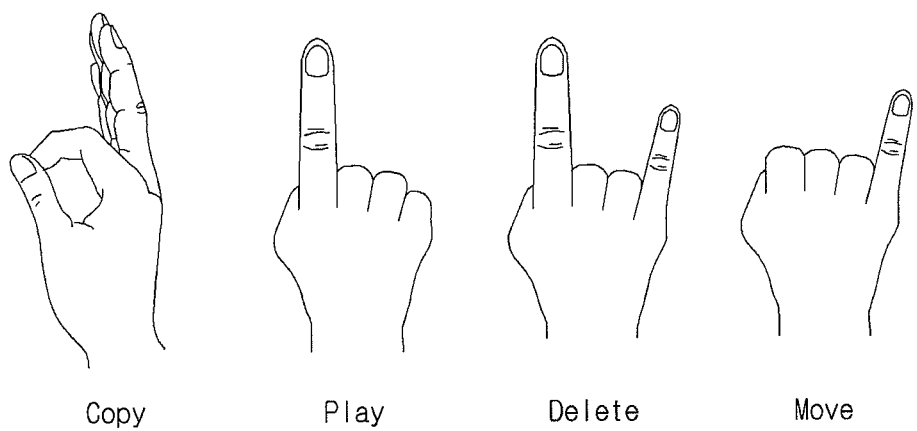
FIG. 3 is a view illustrating a user's hand gesture and a function corresponding thereto according to an embodiment of the present invention.

FIG. 3 is a view illustrating a user's hand gesture and a function corresponding thereto according to an embodiment of the present invention. Referring to FIG. 3, a plurality of hand gestures and a function corresponding to each thereof are described. A first hand gesture of making a circle with the thumb and the index finger can correspond to a function for copying a media content displayed on the display unit 180. Here, the media content can be one of video, picture, audio file, and application but is not limited thereto.

A second hand gesture of extending only the index finger can correspond to a function for playing a media content displayed on the display unit 180. A third hand gesture of extending only the index finger and the ring finger can correspond to a function for deleting a media content displayed on the display unit 180. A fourth hand gesture of extending only the ring finger can correspond to a function for moving a media content displayed on the display unit 180.

Hand gestures shown in FIG. 3 and a function corresponding to each thereof are just exemplary. The hand gestures shown in FIG. 3 and the function corresponding to each thereof can be set by default and can vary according to a user's setting.

Referring again to FIG. 2, the control unit 170 checks whether the user is a registered user through the recognized user's face (S105). According to an embodiment, the control unit 170 can compare the recognized user's face with a plurality of user's faces pre-stored in the storage unit 140 so as to check whether the recognized user is a registered user. The storage unit 140 can match information on a plurality of users to pre-registered user's faces, respectively, and can then store it.

User information can include a user's ID and a user's password used for logging in the display device 100. The control unit 170 can compare the recognized user's face with a plurality of user's faces stored in the storage unit 140 so as to check whether a user corresponding to the recognized user's face is a registered user.

According to an embodiment, whether a user is registered can relate to whether the user can receive a service provided from the display device 100. That is, a registered user is a user who can receive a service provided from the display device 10 and an unregistered user is a user who cannot receive a service provided from the display device 100. Here, the service provided from the display device 100 can be a service recognizing a user's hand gesture and providing a function corresponding to the recognized hand gesture but this is just exemplary.

If the control unit 170 confirms the user is not a registered user (No in S105), the control unit 170 displays a registration window for registering a new user through the display unit 180 (S107). The control unit 170 can compare the recognized user's face with the plurality of user's faces stored in the storage unit 140. Based on a comparison result, if the recognized user's face does not match the plurality of user's faces, the control unit 170 can determine that the recognized user is not a registered user. In this instance, the control unit 170 can display a registration window for registering the recognized user as a new user through the display unit 180.

Figure 4:
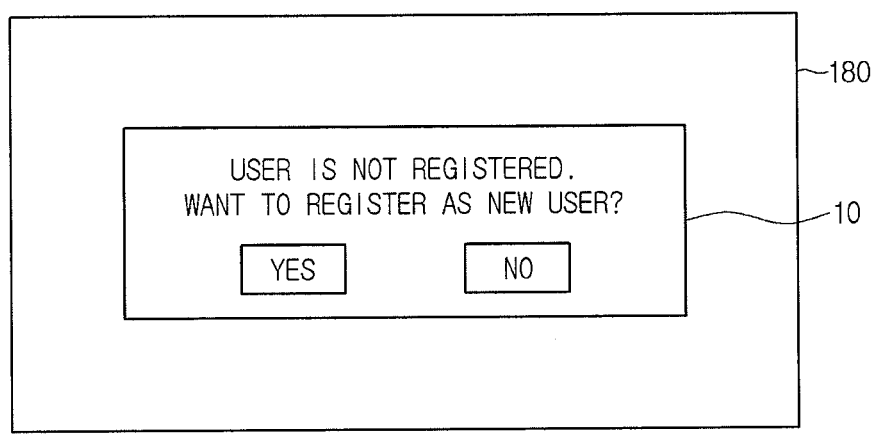
FIG. 4 is a view illustrating a procedure for registering a new user according to an embodiment of the present invention.

This will be described with reference to FIG. 4. In particular, FIG. 4 is a view illustrating a process for registering a new user according to an embodiment of the present invention. Referring to FIG. 4, when a user recognized through an obtained image is not a registered user, the control unit 170 displays a registration window 10 for inquiring new user's registration through the display unit 180. When a user selects a <yes> button, the control unit 170 can undergo a process for recognizing a user's face and registering the recognized user's face as a new user.

When it is confirmed that the user is a registered user (Yes in S105), the control unit 170 checks whether the recognized user's gesture is a pre-registered gesture (S109). According to an embodiment, the control unit 170 can compare the recognized user's gesture with a plurality of gestures stored in the storage unit 140 so as to check whether the recognized gesture is a registered gesture. That is, the control unit 170 can compare the recognized user's gesture with a plurality of gestures stored in the storage unit 140 so as to check whether the recognized gesture matches a registered gesture.

In more detail, the control unit 170 can measure a similarity between the recognized gesture and each of the plurality of gestures stored in the storage unit 140 and when the measured similarity is greater than a reference similarity, can determine the recognized gesture as a gesture corresponding to a pre-stored gesture. On the contrary, the control unit 170 can measure a similarity between the recognized gesture and each of the plurality of gestures stored in the storage unit 140 and when the measured similarity is less than a reference similarity, can determine that the recognized gesture is not a pre-registered gesture.

Here, the similarity can represent the degree of similarity between a recognized gesture and a pre-registered gesture. Additionally, the reference similarity can be a minimum similarity necessary for determining a recognized gesture as a pre-registered gesture. The reference similarity can be by default or can vary according to a user's setting. The reference similarity can be 70 but this is just an value.

If the control unit 170 confirms the recognized user's gesture is not a pre-registered gesture (No in S109), the control unit 170 displays a function guide through the display unit 180 (S111). That is, if the control unit 170 confirms the recognized user's gesture is not a pre-registered gesture, the control unit 170 can display a function guide for guiding a user's selection to perform a function of the display device 100.

According to an embodiment, the control unit 170 can provide a function guide including a recognized user's gesture and at least one similar gesture representing a gesture pattern similar to the recognized user's gesture, through the display unit 180. In more detail, if the recognized gesture is not a pre-registered gesture, the control unit 170 can display similar gestures whose similarity between the recognized gesture and a plurality of similar gestures is less than a reference similarity, on a function guide.

This will be described in more detail with reference to FIGS. 5 to 9. In particular, FIGS. 5 to 9 are views displaying a function guide when a recognized gesture is not a pre-registered gesture according to an embodiment of the present invention. FIG. 5 is a view illustrating a process that a display device recognizes a user's hand gesture according to an embodiment of the present invention, and FIGS. 6 to 9 are views illustrating a function guide displayed when a recognized gesture is not a pre-registered gesture according to an embodiment of the present invention. Hereinafter, it is assumed that a hand gesture 310 of a recognized user is a motion of the right hand clenching the fist.

First, referring to FIG. 5, the display unit 180 displays a media content list 210 and a user K is disposed at the front of the display device 100 and makes a specific hand gesture. The image acquisition unit 171 can obtain an image of a user disposed at the front of the display device 100, and the control unit 170 can recognize a user's face and a user's hand gesture from the obtained user's image.

Figure 6:
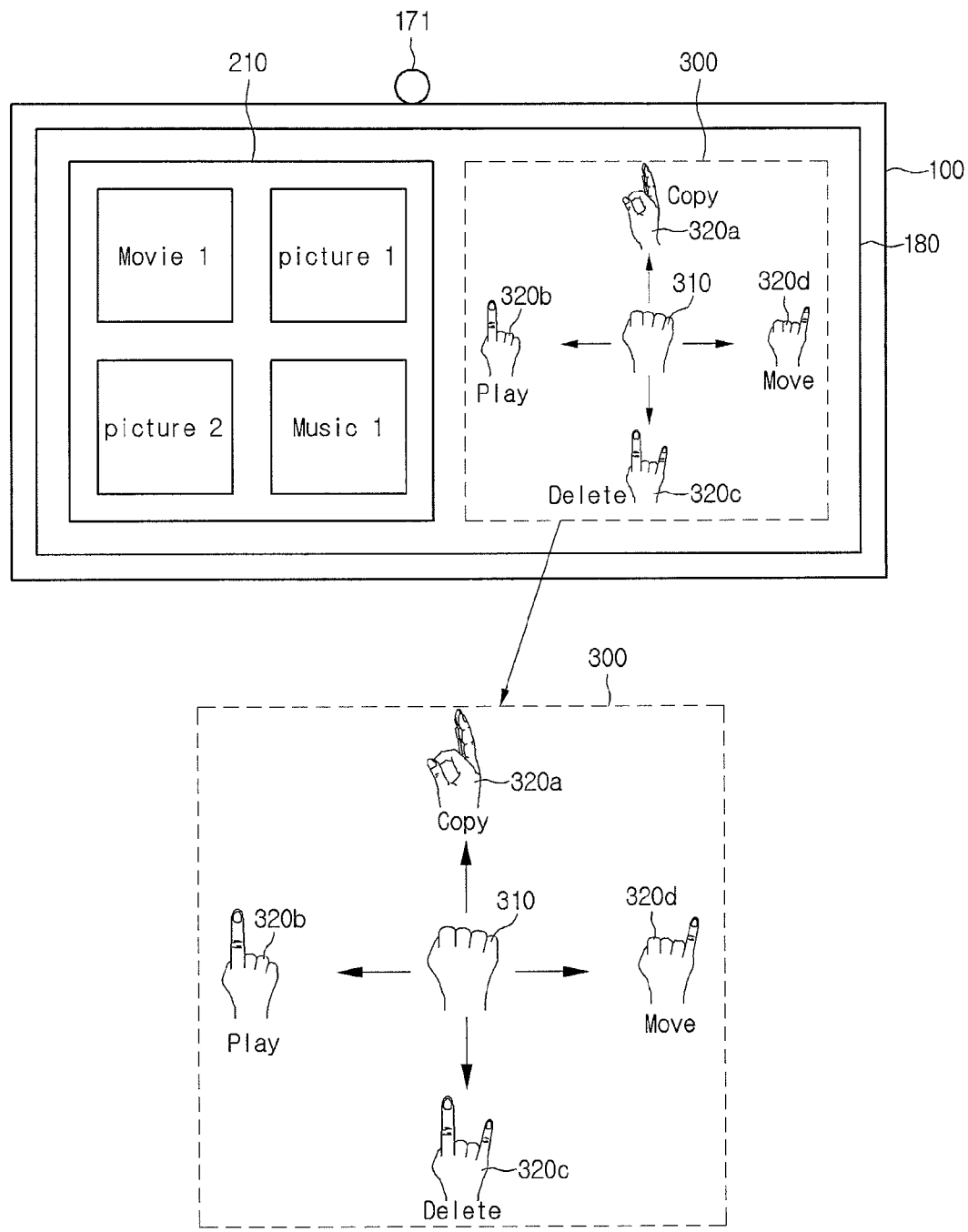

If the control unit 170 confirms the recognized user's hand gesture is not a pre-registered gesture, the control unit 170 displays a function guide 300 shown in FIG. 6. The control unit 170 can display the function guide 300 around a media content list 210 but is not limited thereto and can thus display the function guide 300 in background form on the media content list 210.

The function guide 300 can include the recognized user's hand gesture 310 and a plurality of similar hand gestures 320a, 320b, 320c, and 320d displayed around the recognized user's hand gesture 310. That is, the plurality of similar hand gestures 320a, 320b, 320c, and 320d can be disposed around the captured hand gesture 310 based on the hand gesture 310 captured through the image acquisition unit 171.

A similarity between each of the plurality of similar hand gestures 320a, 320b, 320c, and 320d and the recognized hand gesture 310 is less than a reference similarity but can have a value close to the reference similarity. According to an embodiment of the present invention, it is assumed and described that the number of similar gestures is four but this is just exemplary.

A text describing each function of the plurality of similar hand gestures 320a, 320b, 320c, and 320d can be displayed at one side of each of the plurality of similar hand gestures 320a, 320b, 320c, and 320d. For example, the text <copy> representing a function for copying media content can be displayed at one side of the first similar hand gesture 320a, that is, a motion for making a circle with the thumb and the index finger. Additionally, the text <play> representing a function for playing media content can be displayed at one side of the second similar hand gesture 320b, that is, a motion for extending only the index finger.

Additionally, the text <delete> representing a function for deleting media content can be displayed at one side of the third similar hand gesture 320c, that is, a motion for extending the index finger and the ring finger. Additionally, the text <move> representing a function for moving media content can be displayed at one side of the fourth similar hand gesture 320d, that is, a motion for extending only the ring finger.

After the function guide 300 is displayed and then a movement of a user's hand gesture is detected, the display device 100 can recognize a movement direction in which the user's hand gesture moves and can then perform a function corresponding to the movement direction. For example, when the user's hand gesture moves toward an upper direction, the display device 100 can perform a copy function of media content, that is, a function corresponding to the first similar hand gesture 320a disposed at the upper direction. This will be described later.

Figure 7:
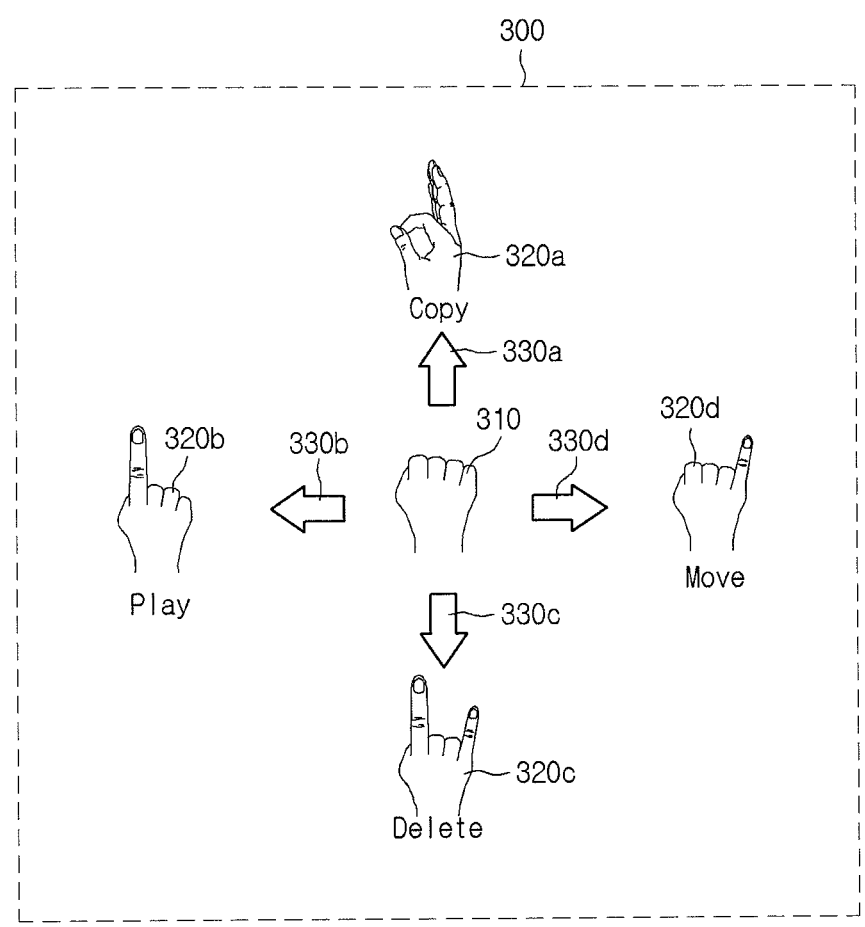

In more detail, FIG. 7 illustrates the function guide 300 can further include a plurality of function inducers 330a, 330b, 330c, and 330d compared to the function guide 300 shown in FIG. 6. That is, the function guide 300 can further include the plurality of function inducers 330a, 330b, 330c, and 330d inducing a user's hand movement (a user's selection) so as to perform a function corresponding to each of the plurality of function inducers 330a, 330b, 330c, and 330d around the recognized hand gesture 310.

Each of the plurality of function inducers 330a, 330b, 330c, and 330d can have an arrow form but this is just exemplary. Each of the plurality of function inducers 330a, 330b, 330c, and 330d can be disposed between the recognized hand gesture 310 and the plurality of similar hand gestures 320a, 320b, 320c, and 320d.

Each of the plurality of function inducers 330a, 330b, 330c, and 330d having an arrow form can induce a user's hand gesture to a specific direction. After the function guide 300 is displayed and then it is detected that the user's hand gesture moves to one direction among directions that the plurality of function inducers 330a, 330b, 330c, and 330d represent, the control unit 170 can perform a function corresponding to the direction that the user's hand gesture moves. For example, when the user's hand gesture moves toward an upper direction, the display device 100 can perform a copy function of media content, that is, a function corresponding to the first similar hand gesture 320a disposed at the upper direction.

Accordingly, a user can perform a function of the display device 100 easily and fast without expressing a hand gesture accurately by using a registered gesture pattern. Additionally, even when a user does not remember a complex gesture pattern accurately, since a plurality of similar hand gestures similar to a hand gesture that the user inputs are provided as a candidate list, the user can perform a function of the display device 100 easily.

Figure 8:
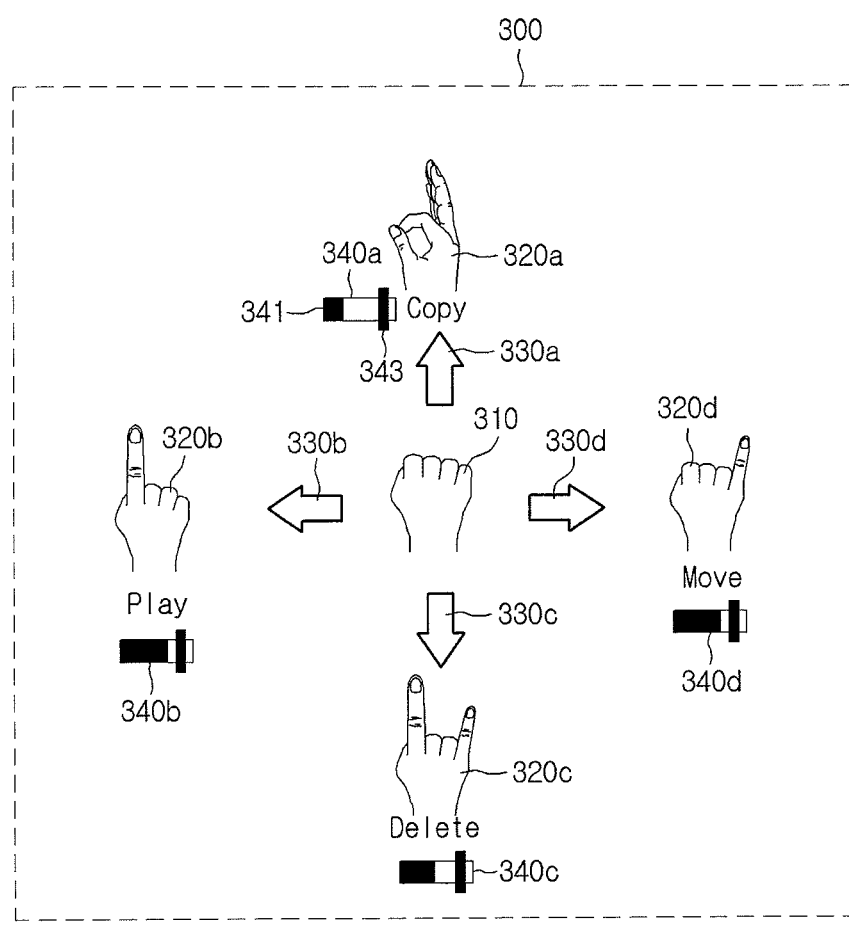

The function guide 300 shown in FIG. 8 can further include a plurality of similarity indicators 340a, 340b, 340c, and 340d compared to the function guide 300 shown in FIG. 7. That is, the function guide 300 can further include the plurality of similarity indicators 340a, 340b, 340c, and 340d indicating the degree of similarity between each of the plurality of similar hand gestures 320a, 320b, 320c, and 320d and the recognized user's hand gesture 310.

Each of the plurality of similarity indicators 340a, 340b, 340c, and 340d can indicate the degree of similarity between each of the plurality of similar hand gestures 320a, 320b, 320c, and 320d and the recognized user's hand gesture 310 through a similarity guide bar 341 and a reference indicator 343. The reference indicator 343 can correspond to a predetermined reference similarity.

Each of the plurality of similarity indicators 340a, 340b, 340c, and 340d can indicate the degree of similarity between each of the plurality of similar hand gestures 320a, 320b, 320c, and 320d and the recognized user's hand gesture 310 through the similarity guide bar 341 based on the reference indicator 343. Since a similarity between each of the plurality of similar hand gestures 320a, 320b, 320c, and 320d and the recognized hand gesture 310 shown in FIG. 8 is less than a reference similarity, a similarity corresponding to each similarity guide bar can be displayed not to exceed the reference similarity. A user can recognize a similar hand gesture having the highest similarity through similarities that the plurality of similarity indicators 340a, 340b, 340c, and 340d represent and can refer it when performing a hand gesture motion later.

Figure 9:
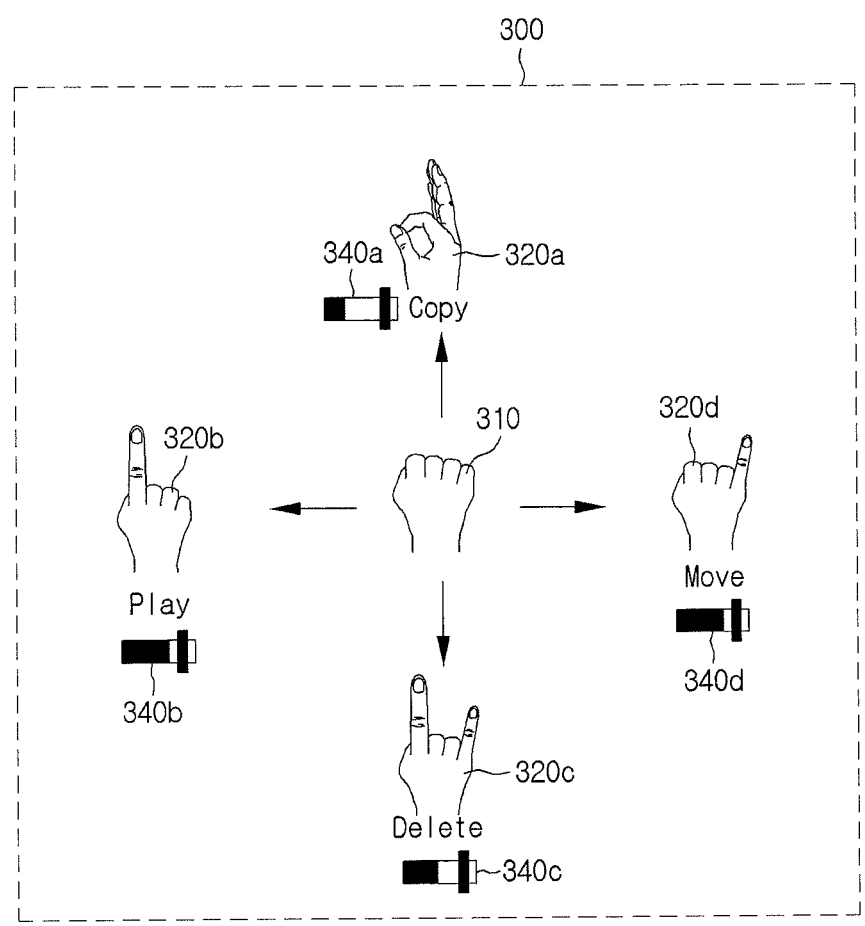

The function guide 300 shown in FIG. 9 can further include a plurality of similarity indicators 340a, 340b, 340c, and 340d compared to the function guide 300 shown in FIG. 6. That is, the function guide 300 can further include the plurality of similarity indicators 340a, 340b, 340c, and 340d indicating the degree of similarity between each of the plurality of similar hand gestures 320a, 320b, 320c, and 320d and the recognized user's hand gesture 310 but can not include the plurality of function inducers 330a, 330b, 330c, and 330d. Descriptions for the plurality of similarity indicators 340a, 340b, 340c, and 340d are identical to the descriptions of FIG. 8.

According to another embodiment, when it is confirmed that a user's gesture is not a pre-registered gesture, the control unit 170 can provide a function guide including a recognized user's gesture and at least one predetermined basic gesture, through the display unit 180. Here, the at least one predetermined basic gesture can not be a gesture pattern not similar to the recognized user's gesture. Basic gestures can be set by default or can be gestures predetermined by a user.

Figure 10:
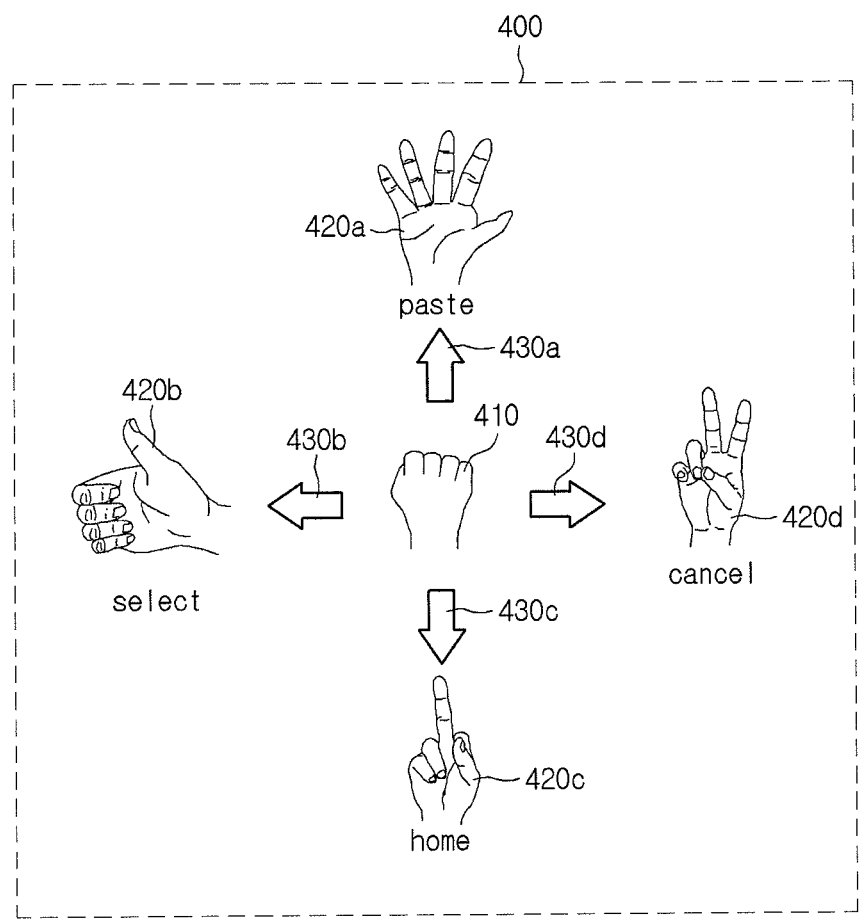
FIG. 10 is a view illustrating a displayed function guide according to another embodiment of the present invention.

This will be described with reference to FIG. 10. In particular, FIG. 10 is a view illustrating a displayed function guide according to another embodiment of the present invention. When the control unit 170 recognizes user's hand gesture is not a pre-registered gesture, the control unit 170 displays a function guide including the recognized user's gesture and at least one predetermined basic hand gesture, through the display unit 180. Here, the at least one predetermined basic hand gesture is a gesture pattern similar to the recognized user's hand gesture or a gesture pattern not similar to the recognized user's hand gesture.

Referring to FIG. 10, the function guide 400 can include a recognized user's hand gesture 410, a plurality of basic hand gestures 420a, 420b, 420c, and 420d, and a plurality of function inducers 430a, 430b, 430c, and 430d. Each of the plurality of basic hand gestures 420a, 420b, 420c, and 420d displayed on the function guide 400 can be a predetermined hand gesture regardless of a similarity to the recognized user's hand gesture 410. Accordingly, the function guide 400 according to the embodiment of FIG. 10 may include a plurality of non-similar indicators.

The function guide 400 shown in FIG. 10 can include a first basic hand gesture 420a for extending all the fingers of the left hand, a second basic hand gesture 420b for extending only the thumb of the left hand, a third basic hand gesture 420c for extending the middle finger of the left hand, and a fourth basic hand gesture 420d for extending only the index finger and the middle finger of the left hand.

A text representing a function of a corresponding basic hand gesture can be displayed at one side of each of the plurality of basic hand gestures 420a, 420b, 420c, and 420d. That is, the first basic hand gesture 410a can correspond to a paste function for pasting media content, the second basic hand gesture 410b can correspond to a select function for selecting media content, the third basic hand gesture 410c can correspond to a home function for returning to a home screen of the display device 100, and the fourth basic hand gesture 410d can correspond to a cancel function for cancelling a selection of media content.

According to another embodiment, the control unit 170 can provide a different function guide according to whether a user's hand corresponding to the recognized user's hand gesture is the left hand or the right hand. When the recognized user is a registered user (S105) and the recognized gesture is not a pre-registered gesture (S109), the control unit 170 can display a function guide based on a position relationship of a user's face and a user's hand gesture.

In more detail, the control unit 170 can provide a different function guide according to a direction in which a user's hand gesture is disposed based on a user's face. In more detail, when the control unit 170 confirms that a user's hand gesture is disposed at the left based on a user's face, the control unit 170 can determine that the hand corresponding to the user's hand gesture is the left hand and when that the control unit 170 confirms a user's hand gesture is disposed at the right based on a user's face, the control unit 170 can determine that the hand corresponding to the user's hand gesture is the right hand.

The control unit 170 can provide a different function guide according to a checked user's hand direction. According to an embodiment, when the checked user's hand is the right hand, the control unit 170 can provide a gesture pattern similar to the recognized hand gesture and when the checked user's hand is the left hand, the control unit 170 can provide a basic gesture pattern.

Figure 12:
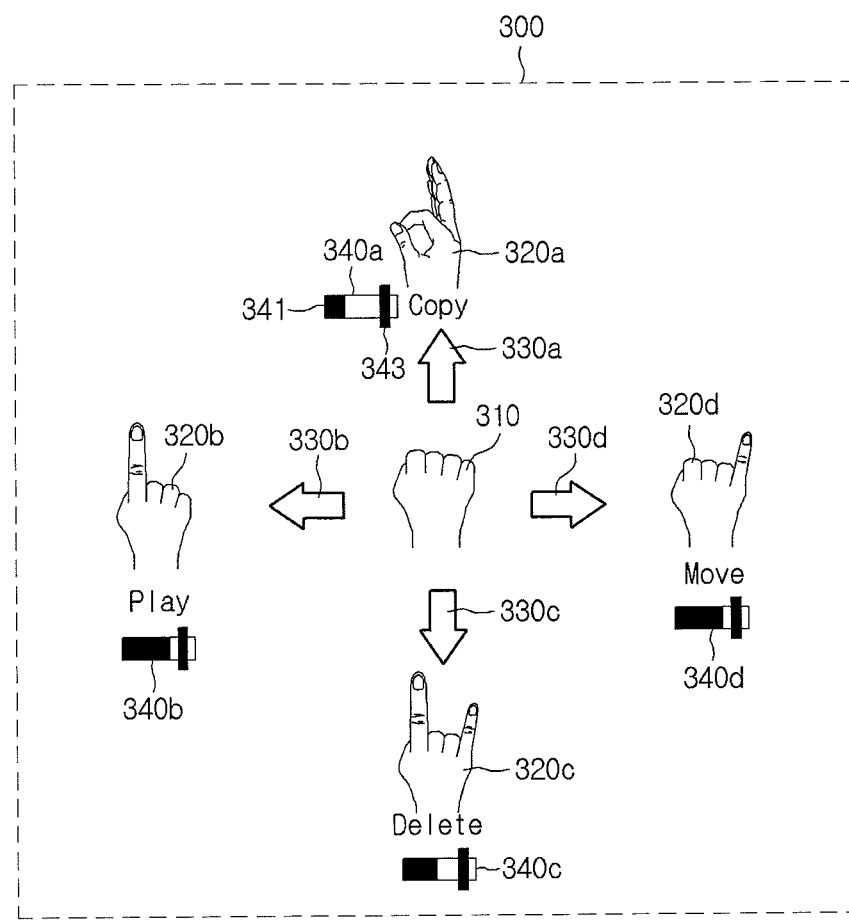
Figure 14:
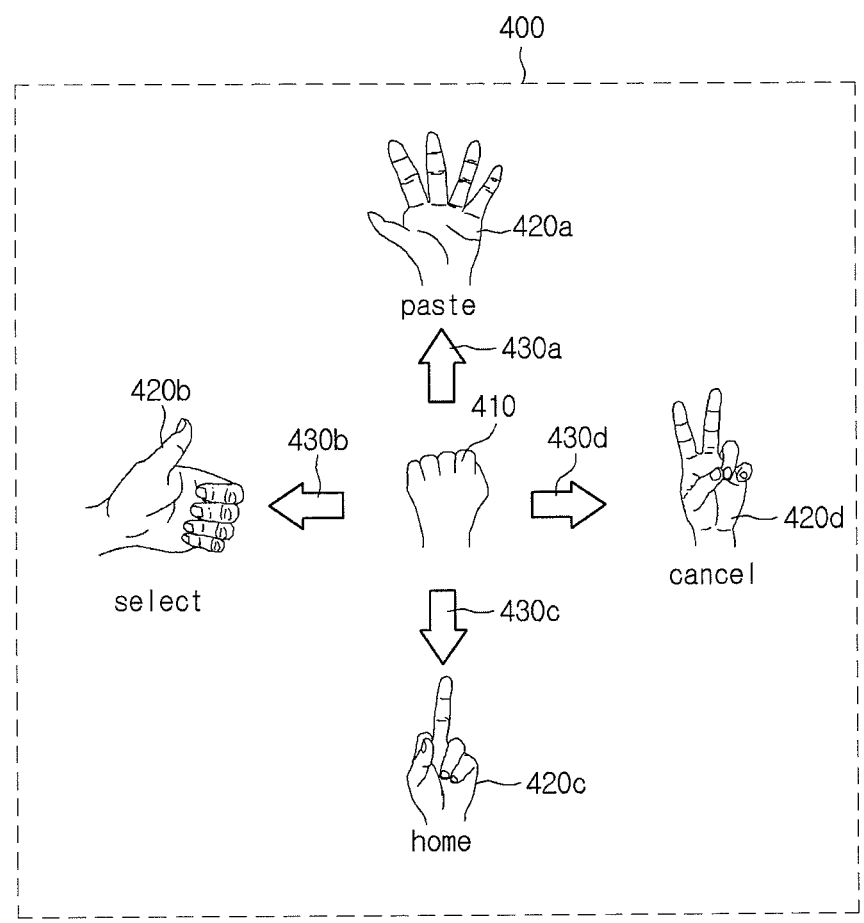

This will be described with reference to FIG. 11 FIGS. 11 to 14. In particular, FIGS. 11 to 14 are views displaying a different function guide depending on which hand a recognized hand gesture represents according to an embodiment of the present invention. For example, FIGS. 11 and 12 are views illustrating a displayed function guide when the hand that the recognized hand gesture is the right hand and FIGS. 13 and 14 are views illustrating a displayed function guide when the hand that the recognized hand gesture is the left hand.

Referring to FIG. 11, the control unit 170 can recognize a user's face and a user's hand gesture obtained through the image acquisition unit 171 and can check the position of the user's hand gesture based on the user's face. If the control unit 170 confirms the hand corresponding to the hand gesture is the right hand according to the position of the confirmed hand gesture, the control unit 170 can display a function guide 300 corresponding to the right hand as shown in FIG. 12. The function guide 300 shown in FIG. 12 is identical to the function guide 300 shown in FIG. 8. That is, if the control unit 170 confirms the hand corresponding to the recognized user's hand gesture is the right hand, the control unit 170 can display the function guide 300 providing a gesture pattern similar to a hand gesture for the right hand. Additionally, when the hand corresponding to the recognized user's hand gesture is the right hand, the control unit 170 can display the function guide 300 corresponding to FIGS. 6, 7, and 9.

Referring to FIG. 13, the control unit 170 can recognize a user's face and a user's hand gesture obtained through the image acquisition unit 171 and can check the position of the user's hand gesture based on the user's face according to the position of the confirmed hand gesture. If the control unit 170 confirms the hand corresponding to the recognized user's hand gesture is the left hand, the control unit 170 can display a function guide 400 including a plurality of basic hand gestures through the display unit 180 as shown in FIG. 14.

The function guide 400 shown in FIG. 14 is identical to the function guide 400 shown in FIG. 10. That is, if the control unit 170 confirms the hand corresponding to a recognized user's hand gesture is the left hand, the control unit 170 can provide a function guide 400 including a gesture pattern similar to a hand gesture for the left hand and a predetermined basic gesture pattern.

Unlike the descriptions of FIGS. 11 to 14, according to another embodiment of the present invention, when the checked user's hand is the right hand, the control unit 170 can provide a function guide including a basic gesture pattern and when the checked user's hand is the left hand, the control unit 170 can provide a gesture pattern similar to a hand gesture for the left hand. This will be described with reference to FIGS. 15 and 16.

Figure 15:
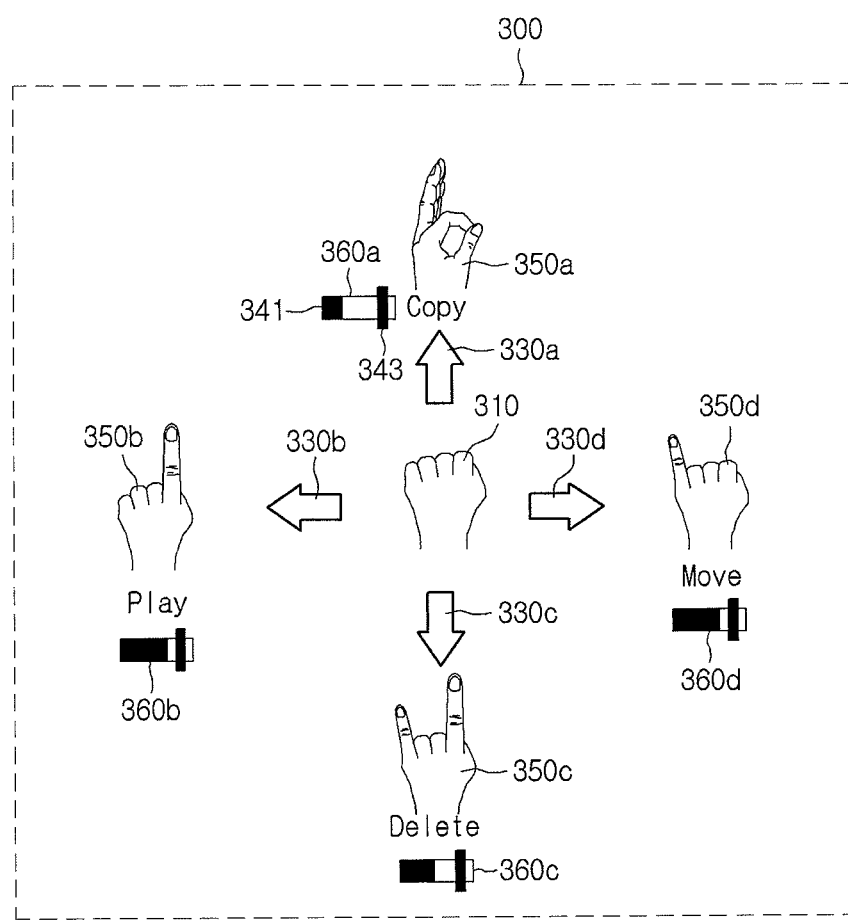

Referring to FIG. 15, when the hand corresponding to a recognized user's hand gesture is the left hand, the control unit 170 can display a function guide 300 corresponding to the left hand. In the function guide 300 shown in FIG. 15, only the direction of the hand is changed compared to FIG. 12 but the remaining content can be identical to that of FIG. 12. That is, the function guide 300 corresponding to the left hand can include a hand gesture 370 corresponding to the recognized left hand, a plurality of similarity hand gestures 350a, 350b, 350c, and 350d, a plurality of function inducers 330a, 330b, 330c, and 330d, and a plurality of function indicators 360a, 360b, 360c, and 360d.

Figure 16:
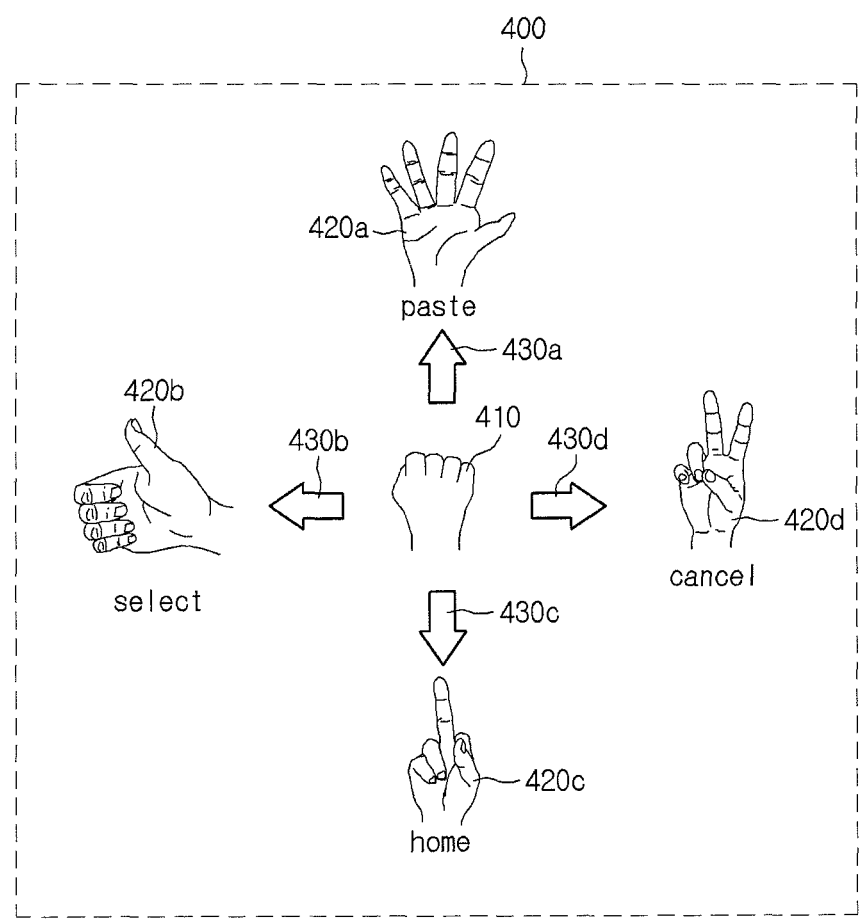

Referring to FIG. 16, when the hand corresponding to a recognized hand gesture is the right hand, the control unit 170 can display a function guide 400 including a basic hand gesture pattern. In the function guide 400 shown in FIG. 16, only the direction of the hand is changed compared to FIG. 14 but the remaining content can be identical to that of FIG. 14. However, the present invention is not limited thereto and when the hand corresponding to the recognized user hand gesture is the right hand, the control unit 170 can display a guide identical to the function guide 400 shown in FIG. 14.

According to another embodiment, when a user's hand gesture is a gesture for both hands of a user, the control unit 170 can display a function guide 300 corresponding to the both hands. This will be described with reference to FIGS. 17 and 18. In particular, FIG. 17 is a view illustrating a displayed function guide when a recognized hand gesture is a gesture for both hands of a user according to an embodiment of the present invention.

Figure 17:
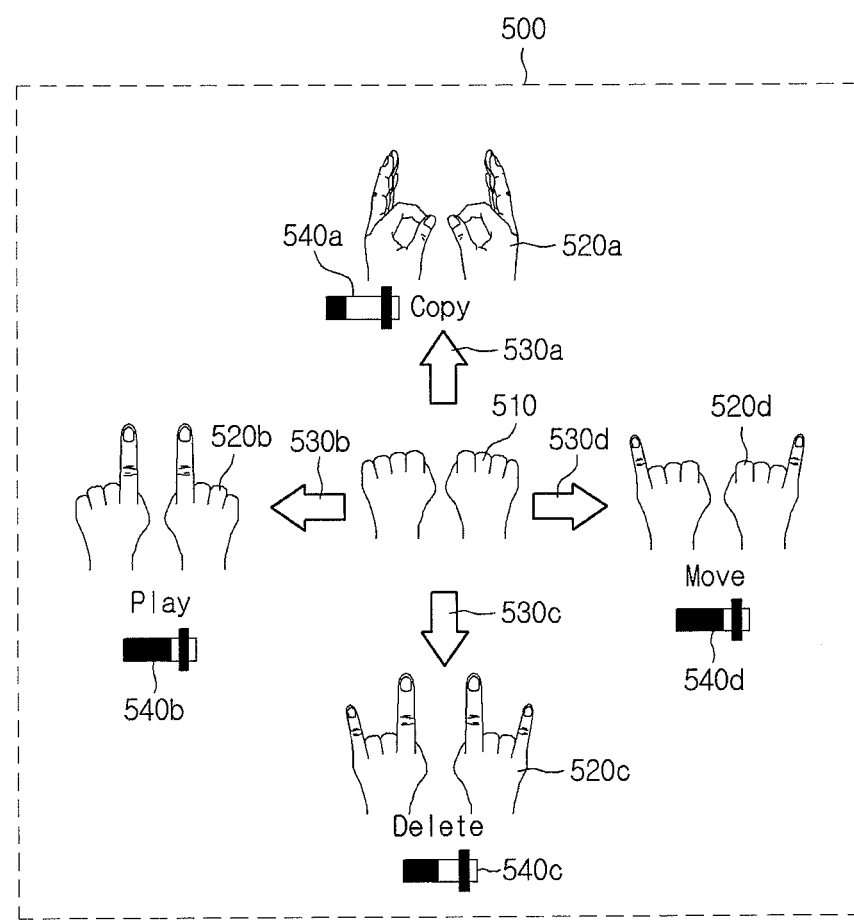
FIG. 17 is a view illustrating a displayed function guide when a recognized hand gesture is a gesture for both hands of a user according to an embodiment of the present invention.

Referring to FIG. 17, when a recognized hand gesture is a gesture for both hands of a user, the control unit 170 can display a function guide 500 corresponding to the both hands. That is, the function guide 500 can include a hand gesture 510 for recognized both hands and a plurality of similar hand gestures 520*a*, 520*b*, 520*c*, and 520*d*. Each of the plurality of similar hand gestures 520*a*, 520*b*, 520*c*, and 520*d* can be disposed at the top, bottom, left, and right of the hand gesture 510 based on the hand gesture 510 for recognized both hands.

A text describing each function of the plurality of similar hand gestures 520*a*, 520*b*, 520*c*, and 520*d* can be displayed at one side of each of the plurality of similar hand gestures 520*a*, 520*b*, 520*c*, and 520*d*. For example, the text <zoom-in> representing a function for enlarging the display of media content can be displayed at one side of the fifth similar hand gesture 520*a*, that is, a motion for making a circle with the thumb and the index finger of each of the both hands.

Additionally, the text <zoom-out> representing a function for reducing the display of media content can be displayed at one side of the sixth similar hand gesture 520*b*, that is, a motion for extending only the index finger of each of the both hands. Additionally, the text  representing a function for displaying a previous content list can be displayed at one side of the seventh similar hand gesture 520*c*, that is, a motion for extending the thumb and the index finger of each of the both hands. Additionally, the text <move> representing a function for displaying the next content list can be displayed at one side of the eighth similar hand gesture 520*d*, that is, a motion for extending only the ring finger of each of the both hands.

Additionally, the function guide 500 shown in FIG. 17 can further include a plurality of function inducers inducing a corresponding function 530*a*, 530*b*, 530*c*, and 530*d* and a plurality of similarity indicators representing the degree of similarity 540*a*, 540*b*, 540*c*, and 540*d*.

Figure 18:
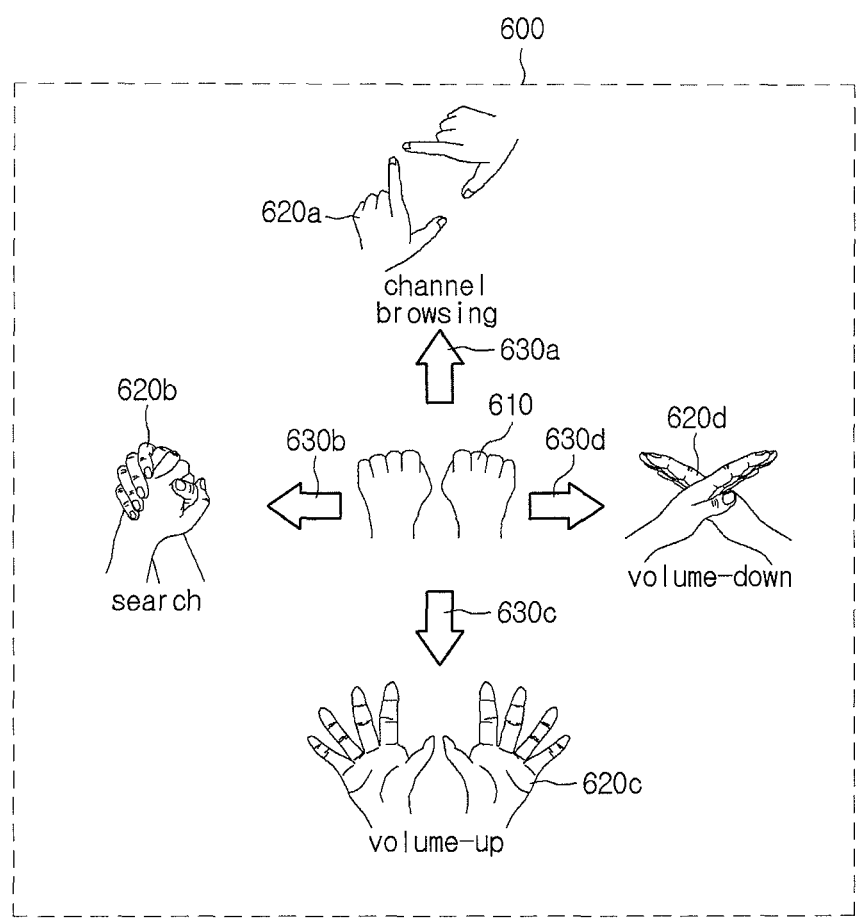
FIG. 18 is a view illustrating a displayed function guide when a recognized hand gesture is a gesture for both hands of a user according to another embodiment of the present invention.

FIG. 18 is a view illustrating a displayed function guide when a recognized hand gesture is a gesture for both hands of a user according to another embodiment of the present invention. When the recognized hand gesture is a gesture for user's both hands, the control unit 170 can provide a function guide 600 including a predetermined both hands basic gesture pattern regardless of a similarity between the recognized both hands gesture and a pre-registered both hands gesture.

That is, as shown in FIG. 18, the function guide 600 can include a recognized both hands gesture 610, a plurality of both hands basic gestures 620*a*, 620*b*, 620*c*, and 620*d* and a plurality of function inducers 630*a*, 630*b*, 630*c*, and 630*d*. A text describing each function of the plurality of both hands basic gestures 620*a*, 620*b*, 620*c*, and 620*d* can be displayed at one side of each of the plurality of both hands basic gestures 620*a*, 620*b*, 620*c*, and 620*d*.

For example, the text <channel browsing> representing a function for displaying channel information can be displayed at one side of the first both hands basic gesture 620*a*, that is, a motion for spreading the thumb and the index finger of each of both hands and forming a gathering shape. Additionally, the text <search> representing a search function can be displayed at one side of the second both hands basic gesture 620*b*, that is, a motion for holding both hands each other. Additionally, the text <volume-up> representing a function for increasing the volume of audio can be displayed at one side of the third both hands basic gesture 620*c*, that is, a motion for spreading each of the both hands.

Additionally, the text <volume-down> representing a function for decreasing the volume of audio can be displayed at one side of the fourth both hands basic gesture 620*d*, that is, a motion for spreading each of both hands and intersecting them.

According to another embodiment, when a recognized hand gesture is a gesture for user's both hands, the control unit 170 can display a function guide providing a basic gesture pattern shown in FIG. 16 instead of the function guide shown in FIG. 17, through the display unit 180.

Referring again to FIG. 2, the control unit 170 obtains an input for selecting a specific gesture from at least one gesture displayed on a function guide screen (S113). According to an embodiment, the input for selecting a specific gesture can be an instruction for moving a user's hand toward a direction where at least one hand gesture among a plurality of hand gestures displayed on a function guide is disposed.

For example, while the function guide 300 shown in FIG. 7 is displayed on the display unit 180, as a user moves a user's hand gesture toward the top, the control unit 170 can determine that the first similar hand gesture 320*a* is selected by recognizing the user's hand gesture moved in the top direction. In the same manner, when a user moves a user's hand gesture toward the left, the control unit 170 recognizes the user's hand gesture moved to the left direction and determines that the second similar hand gesture 320*b* is selected.

When a user moves a user's hand gesture toward the bottom, the control unit 170 recognizes the user's hand gesture moved to the bottom direction and determines that the third similar hand gesture 320*c* is selected. When a user moves a user's hand gesture toward the right, the control unit 170 recognizes the user's hand gesture moved to the right direction and determines that the fourth similar hand gesture 320 is selected.

The control unit 170 performs a function corresponding to the selected gesture (S115). For example, as a user moves a user's hand gesture toward the top in the function guide 300 shown in FIG. 7, the first similar hand gesture 320*a* can be selected and the control unit 170 can perform a copy function of media content, that is, a function corresponding to the selected first similar hand gesture 320*a*.

In this instance, it is assumed that the media content is selected in advance. In the same manner, as a user moves a user's hand gesture toward the left in the function guide 300 shown in FIG. 7, the second similar hand gesture 320*b* can be selected and the control unit 170 can perform a play function of media content, that is, a function corresponding to the selected second similar hand gesture 320*b*.

Next, operations S113 to S115 are described with reference to FIGS. 19 to 26. In particular, FIGS. 19 to 26 are views illustrating a process for performing a corresponding function in correspondence to the selection of a specific gesture displayed in a function guide according to an embodiment of the present invention. Hereinafter, it is assumed and described that a media content 211 of <movie1> is selected. The selection of the media content 211 can be accomplished through a user's hand gesture recognition.

Figure 20:
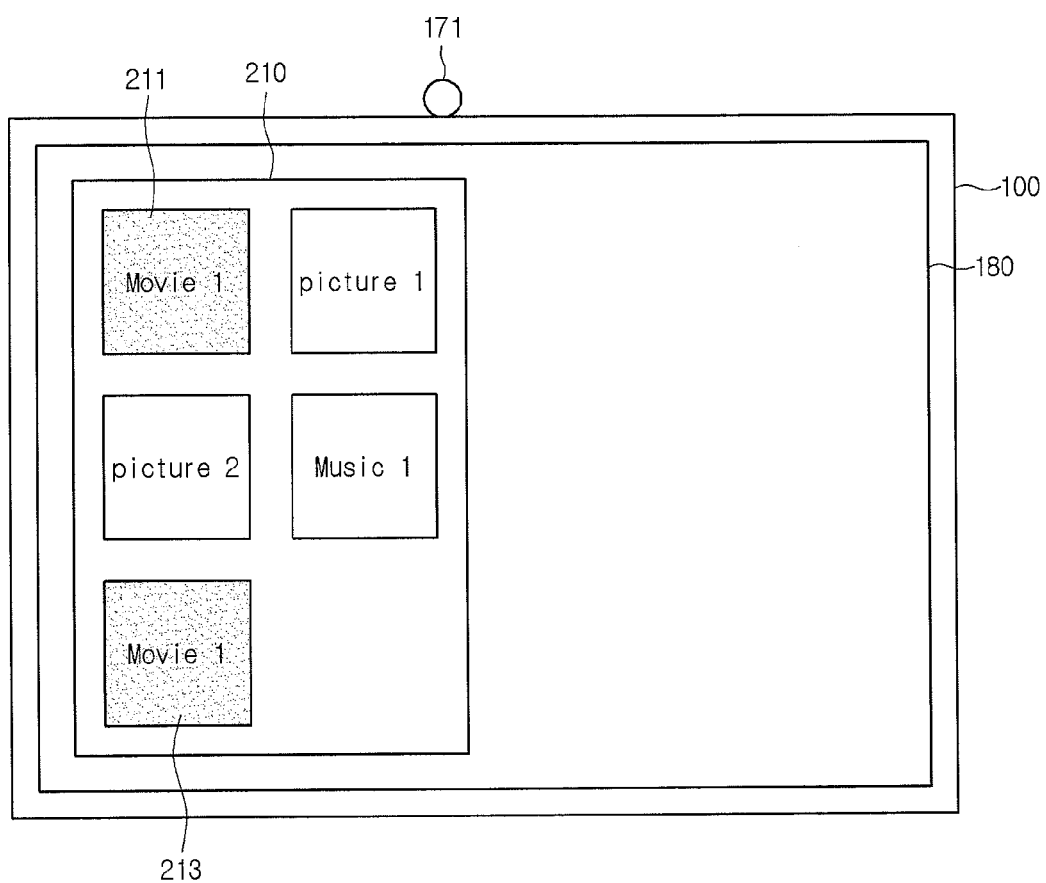

Referring to FIG. 19, while the display device 100 displays the function guide 300, as a user moves the hand toward the top direction, the control unit 170 can detect a moving direction of the user's hand. The control unit 170 can select the first similar hand gesture 320*a* disposed in the top direction of the user's hand based on the recognized user's hand gesture 310 and can perform a plurality of functions corresponding to the selected first similar hand gesture 320*a*. That is, when a user moves the hand toward the top direction, as shown in FIG. 20, a media content 213 representing of the copy of <movie1> can be displayed on the content list 210.

Figure 22:
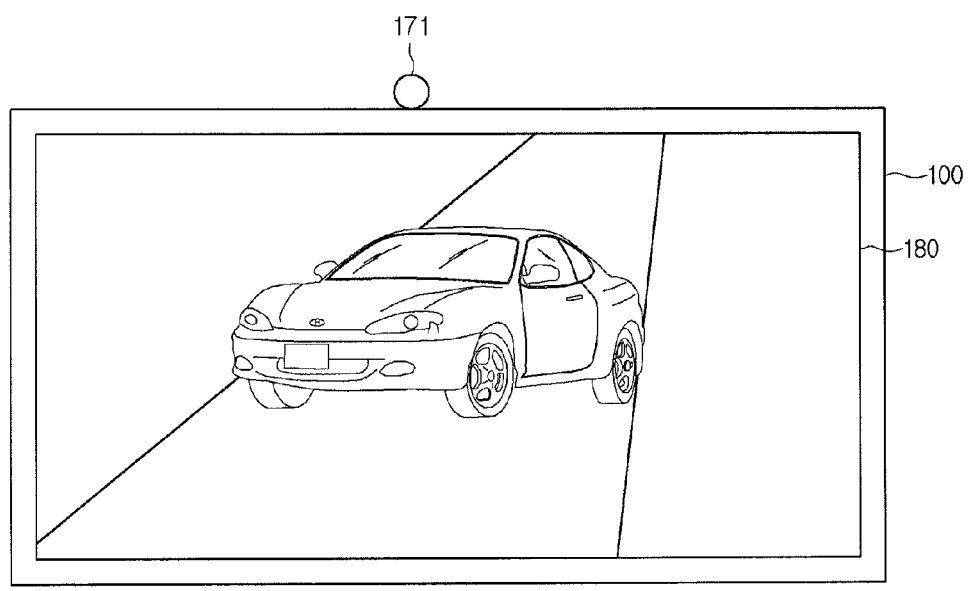

Referring to FIG. 21, while the display device 100 displays the function guide 300, as a user moves the hand toward the left direction, the control unit 170 can detect a moving direction of the user's hand. The control unit 170 can select the second similar hand gesture 320b disposed in the left direction of the user's hand based on the recognized user's hand gesture 310 and can then perform a play function of media content corresponding to the selected second similar hand gesture 320b. That is, when a user moves the hand toward the left direction, as shown in FIG. 22, the media content 211 representing <movie1> can be played through the display unit 180.

Figure 24:
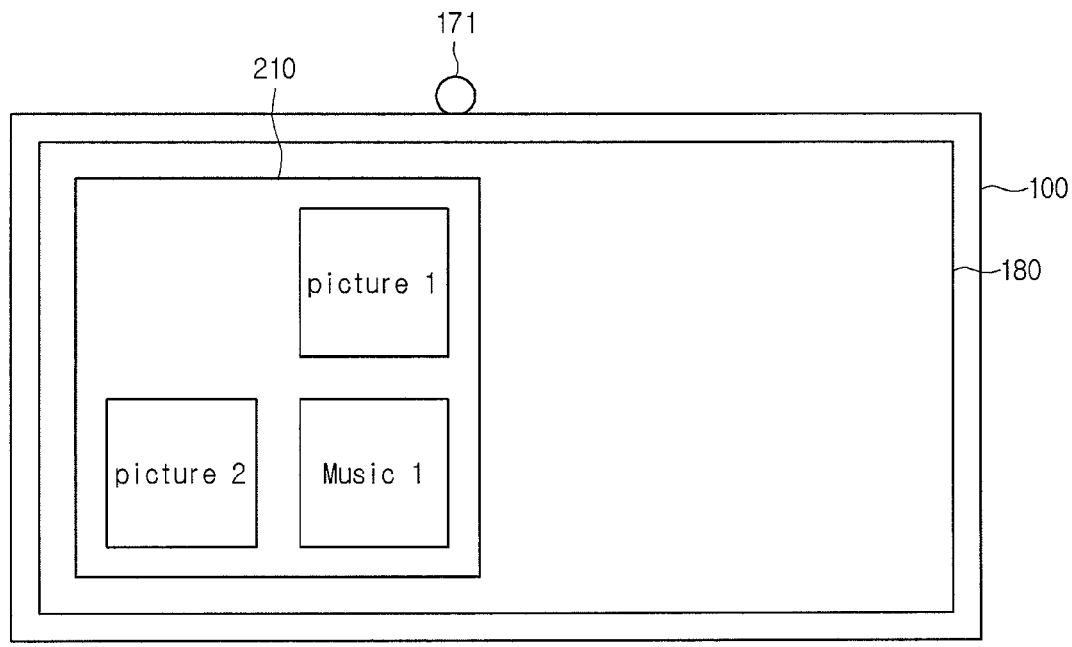

Referring to FIG. 23, while the display device 100 displays the function guide 300, as a user moves the hand toward the bottom direction, the control unit 170 can detect a moving direction of the user's hand. The control unit 170 can select the third similar hand gesture 320c disposed in the bottom direction of the user's hand based on the recognized user's hand gesture 310 and can then perform a delete function of media content corresponding to the selected third similar hand gesture 320c. That is, when a user moves the hand toward the bottom direction, as shown in FIG. 24, the media content 211 representing <movie1> can be deleted from the content list 210.

Figure 26:
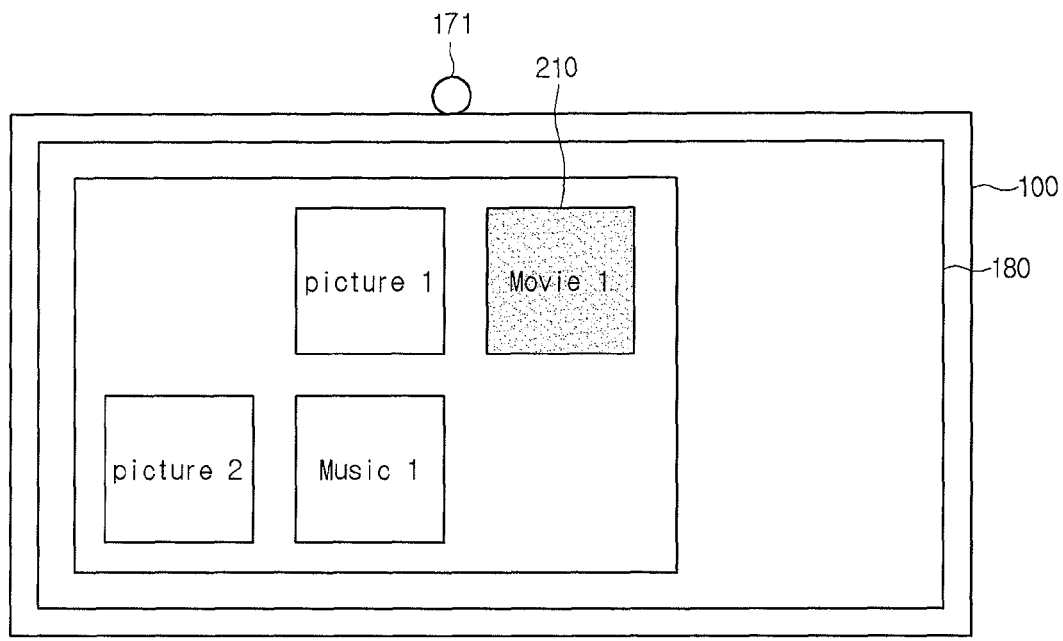

Referring to FIG. 25, while the display device 100 displays the function guide 300, as a user moves the hand toward the right direction, the control unit 170 can detect a moving direction of the user's hand. The control unit 170 can select the fourth similar hand gesture 320d disposed in the right direction of the user's hand based on the recognized user's hand gesture 310 and can then perform a play function of media content corresponding to the selected fourth similar hand gesture 320d. That is, when a user moves the hand toward the right direction, as shown in FIG. 26, the media content 211 representing <movie1> can be moved to the right.

Moreover, if the control unit 170 confirms the recognized user's gesture is a pre-registered gesture (S109), the control unit 170 performs a function of the display device 100 corresponding to the recognized gesture (S117). After the control unit 170 measures a similarity between the recognized gesture and each of a plurality of gestures stored in the storage unit 140, when the measured similarity is greater than a reference similarity, the control unit 170 can determine the recognized gesture as a pre-registered gesture and can perform a function corresponding to the pre-registered gesture. For example, when a recognized user's hand gesture is a pre-registered hand gesture, the control unit 170 does not display a function guide and can perform a function corresponding to the pre-registered hand gesture immediately.

According to various embodiments of the present invention, as a function guide displaying similar gestures and a function corresponding to each of the similar gestures is provided, a user does not need to remember a complex hand gesture pattern, so that user's convenience can be improved. Moreover, according to various embodiments of the present invention, as a function guide displaying a basic hand gesture pattern according to a user's hand gesture recognition, a user does not need to remember a complex hand gesture pattern, so that user's convenience can be improved.

Figure 27:
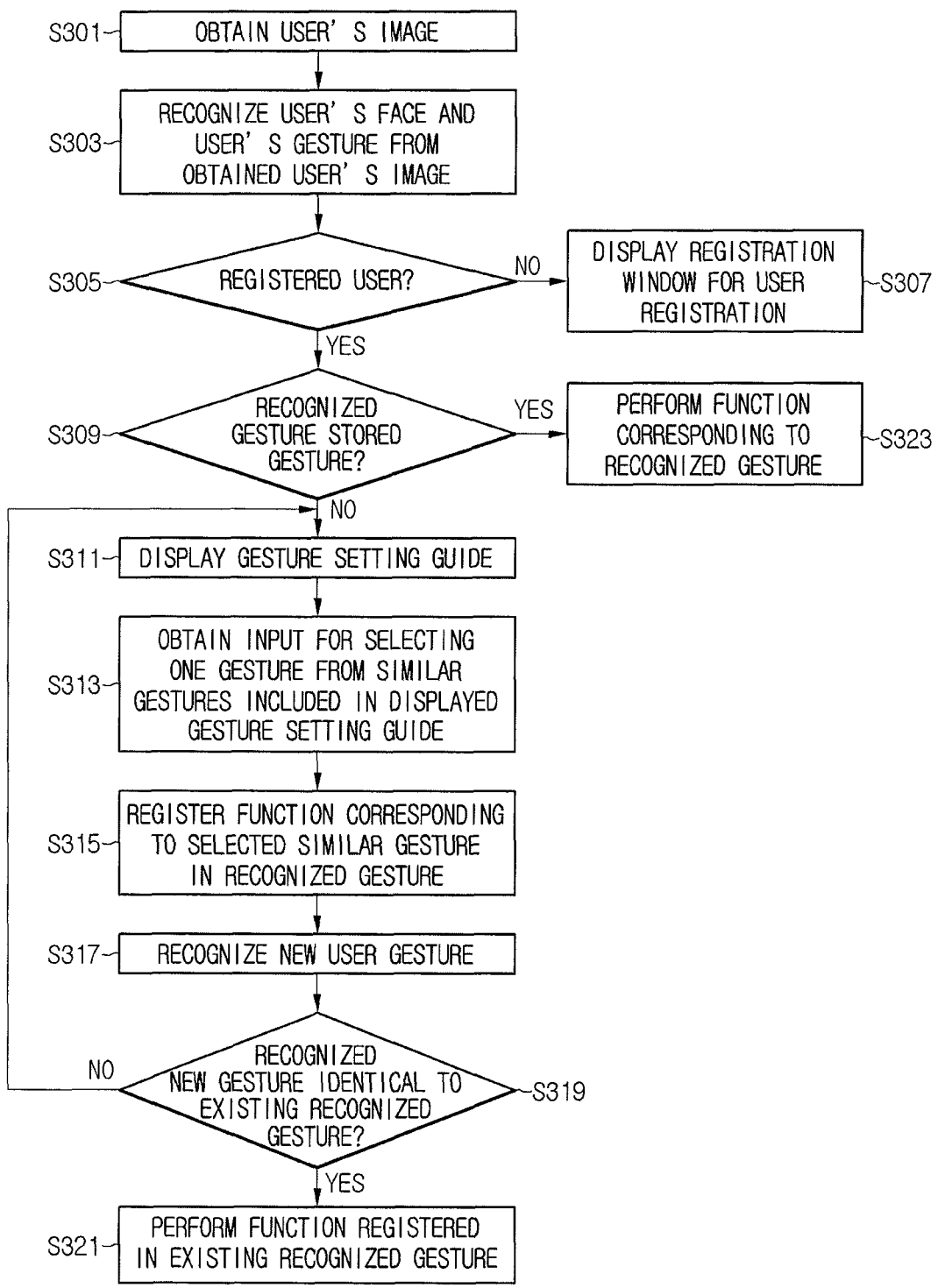
FIG. 27 is a flowchart illustrating an operating method of a display device according to an embodiment of the present invention.

Then, referring to FIG. 27, an operating method of the display device 100 according to another embodiment of the present invention will be described. As shown, the image acquisition unit 171 obtains a user's image (S301).

According to an embodiment, the image acquisition unit 171 can include a camera. The camera can capture the front of the display device 100 thereby obtaining a user's image disposed at the front of the display device 100. The camera can be disposed at the top of the display device 100 to capture a user's image but is not limited thereto and can be disposed at one of the left, right or bottom of the display device 100. Additionally, the camera can not be included in the display device 100 but can exist as an additional component.

The control unit 170 recognizes a user's face and a user's gesture from the obtained user's image (S303). The control unit 170 can recognize a user through the recognized user's face and user's gesture. Further, the control unit 170 can extract a user's face area and a user's hand area from the obtained user's image.

The control unit 170 can extract a user's face area and a user's hand area by dividing a user's face color, a user's hand color, and a background color other than the user's face and hand. Additionally, the control unit 170 can recognize a user's face and a user's hand motion, for example, a hand's shape or movement, by using the extracted user's face area and user's hand area.

According to an embodiment of the present invention, the control unit 170 can recognize one of a user's face and a user's gesture. A user's gesture can be a hand gesture corresponding to the user's hand area. A plurality of hand gestures can correspond to functions of the display device 100, respectively. That is, the control unit 170 can recognize one hand gesture among the plurality of hand gestures and can perform a function corresponding to the recognized hand gesture. This is the same description as FIG. 3.

The control unit 170 checks whether the user is a registered user through the recognized user's face (S305). According to an embodiment, the control unit 170 can compare the recognized user's face with a plurality of user's faces pre-stored in the storage unit 140 so as to check whether the recognized user is a registered user. The storage unit 140 can match information on a plurality of users to pre-registered user's faces, respectively, and can then store it.

User information can include a user's ID and a user's password used for logging in the display device 100. The control unit 170 can compare the recognized user's face with a plurality of user's faces stored in the storage unit 140 so as to check whether a user corresponding to the recognized user's face is a registered user.

According to an embodiment, whether a user is registered can relate to whether the user can receive a service provided from the display device 100. That is, a registered user is a user who can receive a service provided from the display device 10 and an unregistered user is a user who cannot receive a service provided from the display device 100. Here, the service provided from the display device 100 can be a service recognizing a user's hand gesture and providing a function corresponding to the recognized hand gesture but this is just exemplary.

If the control unit 170 confirms the user is not a registered user, the control unit 170 displays a registration window for registering a new user through the display unit 180 (S307). The control unit 170 can compare the recognized user's face with the plurality of user's faces stored in the storage unit 140. Based on a comparison result, if the recognized user's face does not match the plurality of user's faces, the control unit 170 can determine that the recognized user is not a registered user. In this instance, the control unit 170 can display a registration window for registering the recognized user as a new user through the display unit 180.

Moreover, when the control unit 170 confirms the user is a registered user (Yes in S305), the control unit 170 checks whether the recognized user's gesture is a pre-stored gesture (S309). According to an embodiment, the control unit 170 can compare the recognized user's gesture with a plurality of gestures stored in the storage unit 140 so as to check whether the recognized gesture is a gesture pre-stored in the storage unit 140.

In more detail, the control unit 170 can measure a similarity between the recognized gesture and each of the plurality of gestures stored in the storage unit 140 and when the measured similarity is greater than a reference similarity, can determine the recognized gesture as a pre-stored gesture. On the contrary, the control unit 170 can measure a similarity between the recognized gesture and each of the plurality of gestures stored in the storage unit 140 and when the measured similarity is less than a reference similarity, can determine that the recognized gesture is not a pre-stored gesture.

Here, the similarity can represent the degree of similarity between a recognized gesture and a pre-stored gesture. Additionally, the reference similarity can be a minimum similarity necessary for determining a recognized gesture as a pre-stored gesture. The reference similarity can be by default or can vary according to a user's setting. The reference similarity can be 70 but this is just an value.

If the control unit 170 confirms the recognized user's gesture is not a pre-stored gesture (No in S309), the control unit 170 displays a gesture setting guide through the display unit 180 (S311). If the control unit 170 confirms the recognized user's gesture is not a pre-stored gesture (No in S309), the control unit 170 can display a gesture setting guide so as to register the recognized gesture as a function corresponding to the pre-stored gesture (S311). That is, when the recognized user's gesture is not a pre-stored gesture, the gesture setting guide can guide a user so as to allow the recognized user's gesture to have a function corresponding to the pre-stored gesture.

The control unit 170 can provide a gesture setting guide including a recognized user's gesture and at least one similar gesture representing a gesture pattern similar to the recognized user's gesture, through the display unit 180. If the recognized gesture is not a pre-stored gesture, the control unit 170 can display similar gestures whose similarity between the recognized gesture and a plurality of similar gestures is less than a reference similarity, on the gesture setting guide. This will be described in more detail with reference to FIGS. 28 to 31.

Figure 29:
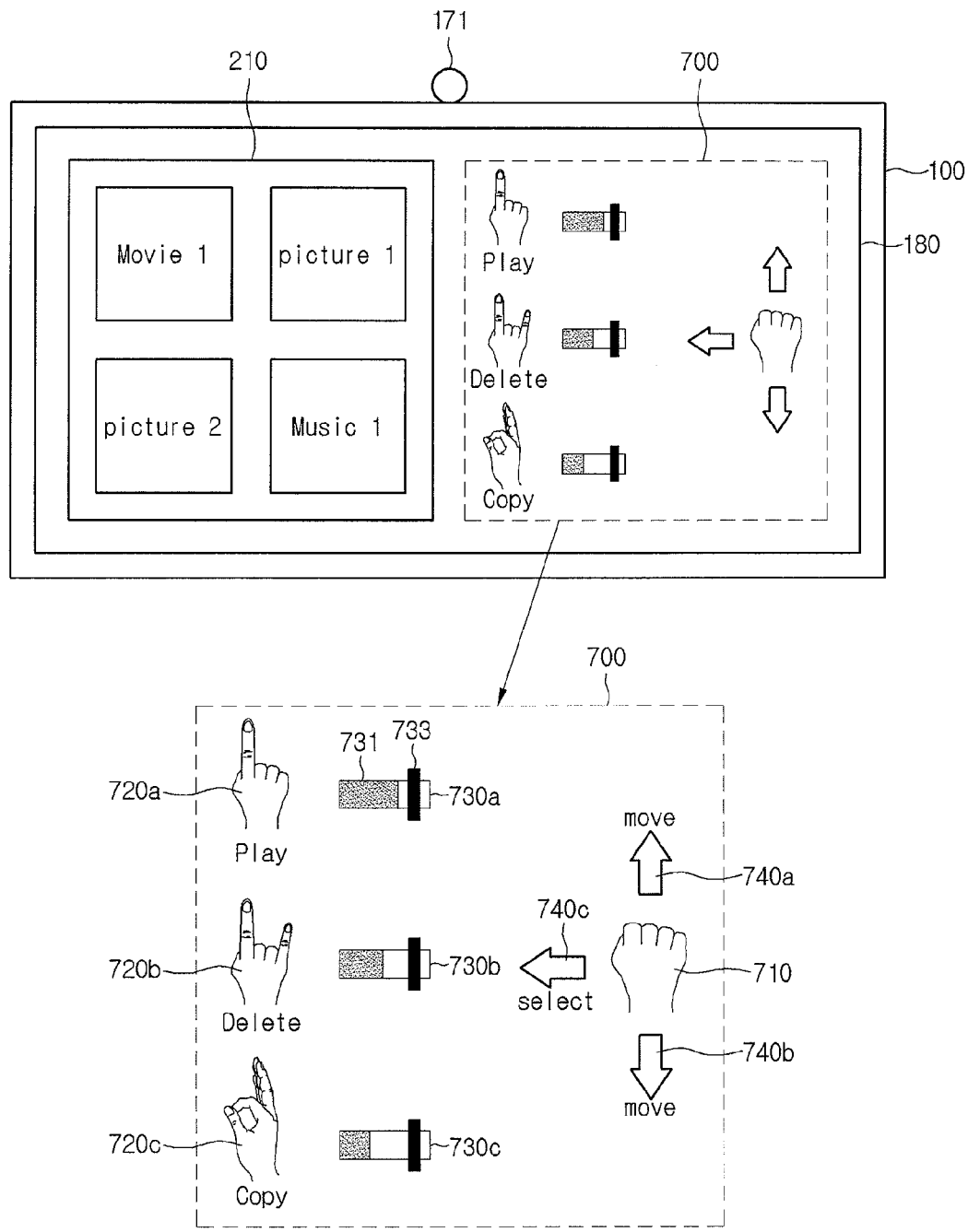
Figure 30:
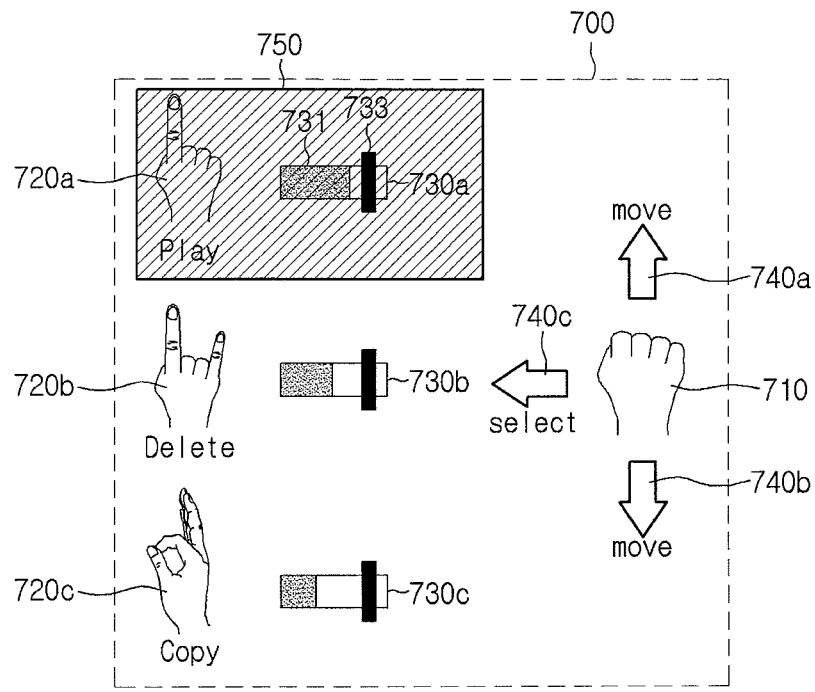
Figure 31:
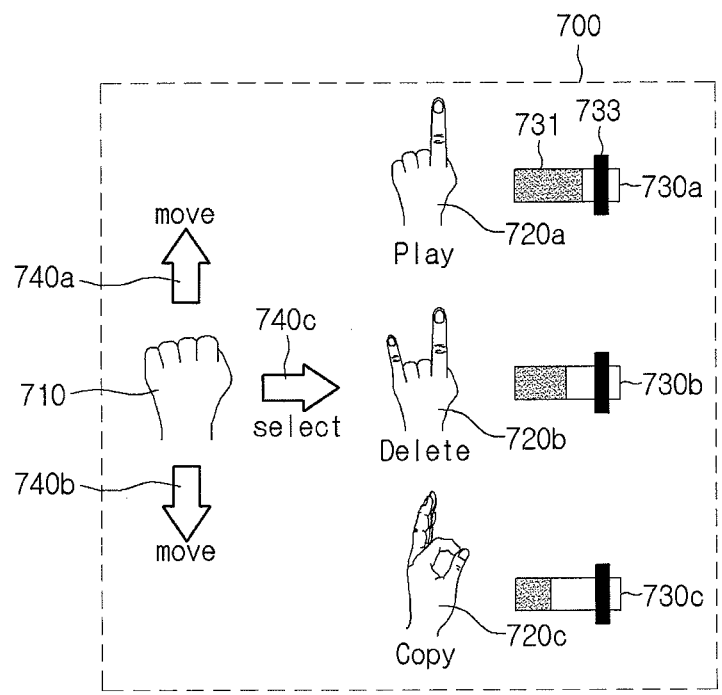

In particular, FIGS. 28 to 31 are views displaying a gesture setting guide when a recognized gesture is not a pre-stored gesture according to an embodiment of the present invention. That is, FIG. 28 is a view illustrating a process that a display device recognizes a user's hand gesture according to an embodiment of the present invention, and FIGS. 29 to 31 are views illustrating a gesture setting guide displayed when a recognized gesture is not a pre-stored gesture according to an embodiment of the present invention.

Hereinafter, it is assumed that a hand gesture 710 of a recognized user is a motion of the right hand clenching the fist. However, the present invention is not limited thereto and the user's hand gesture can be a motion of the left hand clenching the first and a similar hand gesture described below can be a gesture corresponding to the left hand.

First, referring to FIG. 28, the display unit 180 displays a media content list 210 and a user K is disposed at the front of the display device 100 and takes a specific hand gesture. The image acquisition unit 171 can obtain an image of a user disposed at the front of the display device 100 and the control unit 170 can recognize a user's hand gesture from the obtained user's image.

If the control unit 170 confirms the recognized user's hand gesture is not a pre-stored gesture, the control unit 170 displays a gesture setting guide 700 shown in FIG. 29. The control unit 170 can display the gesture setting guide 700 around a media content list 210 but is not limited thereto and can thus display the gesture setting guide 700 in background form on the media content list 210.

The gesture setting guide 700 can include the recognized user's hand gesture 710 and a plurality of similar hand gestures 720a, 720b, and 720c displayed at one side of the recognized user's hand gesture 710. That is, the plurality of similar hand gestures 720a, 720b, and 720c can be disposed at one side of the hand gesture 710 captured through the image acquisition unit 171. A similarity between each of the plurality of similar hand gestures 720a, 720b, and 720c and the recognized hand gesture 710 is less than a reference similarity but can have a value close to the reference similarity. According to an embodiment of the present invention, it is assumed and described that the number of similar gestures is three but this is just and thus, the number of similar gestures can be more than one.

A text describing each function of the plurality of similar hand gestures 720a, 720b, and 720c can be displayed at one side of each of the plurality of similar hand gestures 720a, 720b, and 720c. For example, the text <play> representing a function for playing media content can be displayed at one side of the similar hand gesture 720a, that is, a motion for extending only the index finger. Additionally, the text <delete> representing a function for deleting media content can be displayed at one side of the similar hand gesture 720b, that is, a motion for extending the index finger and the ring finger. Additionally, the text <copy> representing a function for copying media content can be displayed at one side of the similar hand gesture 720c, that is, a motion for making a circle with the thumb and the index finger.

A plurality of similarity indicators 730a, 730b, and 730c can be displayed respectively at one sides of the plurality of similar hand gestures 720a, 720b, and 720c. The plurality of similar hand gestures 720a, 720b, and 720c can respectively correspond to the plurality of similarity indicators 730a, 730b, and 730c.

The gesture setting guide 700 can include the plurality of similarity indicators 730a, 730b, and 730c indicating the degree of similarity between each of the plurality of similar hand gestures 720a, 720b, and 720c and the recognized user's hand gesture 710.

Each of the plurality of similarity indicators 730a, 730b, and 730c can indicate the degree of similarity between each of similarity indicators 730a, 730b, and 730c and the recognized user's hand gesture 710 through a similarity guide bar 731 and a reference indicator 733. The reference indicator 733 can correspond to a predetermined reference similarity.

Each of the plurality of similarity indicators 730a, 730b, and 730c can indicate the degree of similarity between each of the plurality of similar hand gestures 720a, 720b, and 720c and the recognized user's hand gesture 710 through the similarity guide bar 731 based on the reference indicator 733.

Since a similarity between each of the plurality of similar hand gestures 720a, 720b, and 720c and the recognized hand gesture 710 shown in FIG. 29 is less than a reference similarity, a similarity corresponding to each similarity guide bar can be displayed not to exceed the reference similarity.

The plurality of similar hand gestures 720a, 720b, and 720c and the plurality of similarity indicators 730a, 730b, and 730c corresponding thereto can be arranged from top to bottom in descending order of the degree of similarity. A user can recognize a similar hand gesture having the highest similarity through similarities that the plurality of similarity indicators 730a, 730b, and 730c represent and can refer it when performing a hand gesture motion later.

The gesture setting guide 700 can further include a plurality of setting inducers 740a, 740b, and 740c. Each of the plurality of setting inducers 740a, 740b, and 740c can be disposed around the recognized user's hand gesture 710. Each of the plurality of setting inducers 740a, 740b, and 740c can have an arrow form but this is just exemplary.

The plurality of setting inducers 740a, 740b, and 740c can induce a movement of a user's hand (a user's selection) so to match the recognized hand gesture 710 into one of functions that the plurality of similar hand gestures 720a, 720b, and 720c represent. In more detail, the plurality of setting inducers 740a, 740b, and 740c can induce a movement of a user's hand (a user's selection) so to match the recognized hand gesture 710 into one of functions that the plurality of similar hand gestures 720a, 720b, and 720c represent. For this, each of the plurality of setting inducers 740a, 740b, and 740c can have a specific function.

For example, the first setting inducer 740a can induce a movement toward the top direction, the second setting inducer 740b can induce a movement toward the bottom direction, and the third setting inducer 740c can induce a user to select one of a plurality of similar hand gestures. A text representing a function of a setting inducer can be further displayed at one side of each of the plurality of setting inducers 740a, 740b, and 740c. For example, <move> corresponding to a movement toward the top direction can be displayed on the gesture setting guide 700 at one side of the first setting inducer 740a, <move> corresponding to a movement toward the bottom direction can be displayed on the gesture setting guide 700 at one side of the second setting inducer 740b, and <select> corresponding to a function for selecting a similar hand gesture can be displayed on the gesture setting guide 700 at one side of the third setting inducer 740c. This will be described in more detail later.

Referring to FIG. 30, the control unit 170 can highlight the similar hand gesture 720a having the highest similarity to the recognized hand gesture 710 among the plurality of similar hand gestures 720a, 720b, and 720c and can then display it. For example, when the similar hand gesture 720a is determined as a hand gesture having the highest similarity to the recognized hand gesture 710, a corresponding similar hand gesture 729a and a similarity indicator 730a corresponding to the corresponding similar hand gesture 720a can be highlighted and displayed. According to an embodiment, the control unit 170 can highlight the similar hand gesture 720a having the highest similarity to the recognized hand gesture 710 through a highlight box 750.

FIG. 31 is a view illustrating a gesture setting guide 700 displayed when a recognized user's hand gesture 710 is the left hand. When the recognized hand gesture 710 is a gesture corresponding to the left hand, the control unit 170 can display the gesture setting guide 700 corresponding to the left hand. In the gesture setting guide 700 shown in FIG. 31, the hand's direction is changed from a right hand perspective into a left hand perspective, compared to the gesture setting guide 700 shown in FIG. 30. Additionally, the direction of the third setting inducer 740c is changed. According to an embodiment of FIG. 31, since a gesture setting guide customized for a user is provided according to a hand's direction corresponding to a recognized hand gesture, user's convenience can be improved.

Referring again to FIG. 27, the control unit 170 obtains an input for selecting a specific similar gesture among at least one similar gesture included in a displayed gesture setting guide (S313) and registers a function corresponding to the selected specific similar gesture in the recognized gesture (S315).

FIGS. 32 to 35 are views illustrating a procedure for registering a function of a display device in a recognized gesture according to an embodiment of the present invention. After the gesture setting guide 700 shown in FIG. 30 is displayed and then a movement of a user's hand gesture is detected, a movement direction in which the user's hand gesture moves is recognized and a function corresponding to the movement direction can be performed. For example, as shown in FIG. 32, when the user's hand gesture moves toward the bottom direction, the highlight box 750 moves toward the bottom in correspondence to a movement of the hand gesture.

As shown in FIG. 33, when the user's hand gesture moves toward the left direction as shown in FIG. 32, the control unit 170 detects a hand gesture moved to the left direction and performs a selection function of a similar hand gesture, that is, a function corresponding to the movement of the left direction.

Figure 34:
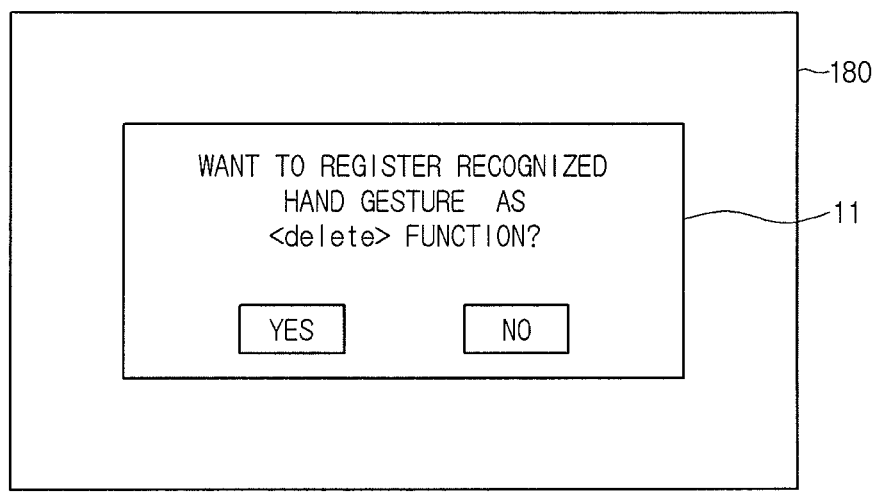

Referring to FIG. 34, after the similar hand gesture 720b is selected, the control unit 170 can display a gesture registration window 11 for inquiring whether to register the recognized hand gesture 710 as a function corresponding to the selected similar hand gesture 720b. When a user agrees, the control unit 170 can register a delete function of a media content corresponding to a function of the selected similar hand gesture 720b in the recognized hand gesture 710.

Figure 35:
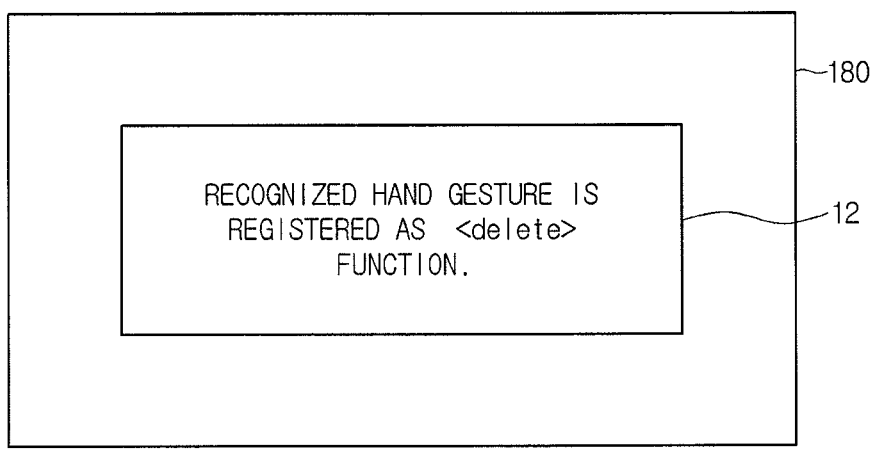

Then, the control unit 170, as shown in FIG. 35, can output a gesture registration completion message 12 indicating that a function of a similar hand gesture is registered in a recognized hand gesture. When recognizing the hand gesture 710 again later, the control unit 170 can perform a delete function of a media content assigned to the hand gesture 710.

According to an embodiment, a process for registering a function corresponding to a selected specific similar gesture in a recognized gesture can be performed by each of a plurality of users. That is, each of a plurality of users can select one of a plurality of similar gestures and can then register a function corresponding to the selected similar gesture in a recognized gesture. Accordingly, even when each of a plurality of users takes the same gesture, a function corresponding to a corresponding gesture can vary.

Referring again to FIG. 27, the control unit 170 recognizes a new user's gesture from a newly obtained user's image (S317). The control unit 170 checks whether the newly recognized user's gesture is identical to a previously recognized user's gesture (S319). According to an embodiment, the control unit 170 can check whether the newly recognized user's gesture is identical to a previously recognized user's gesture through a skin color based analysis. In more detail, the control unit 170 can extract a mask corresponding to a hand's candidate area by detecting only a portion corresponding to the skin color from the newly obtained user's image. The control unit 170 can check whether the newly recognized user's gesture is identical to a previously recognized user's gesture based on the extracted mask.

According to another embodiment, the control unit 170 can perform operation S319 through a similarity comparison for the outlines of a newly recognized user's gesture and a previously recognized user's gesture. That is, when a similarity for the outlines of a newly recognized user's gesture and a previously recognized user's gesture exceeds a reference value, the control unit 170 can confirm that the newly recognized gesture is identical to the previously recognized gesture.

If the newly recognized gesture is identical to the previously recognized gesture (Yes in S319), a function of the display device 100 registered in the previously recognized gesture is performed (S321). If the control unit 170 confirms the newly recognized gesture is not identical to the previously recognized gesture (No in S319), the method returns to operation S311. Moreover, if the control unit 170 confirms the recognized user's gesture is a pre-stored gesture in S309, the control unit 170 performs a function of the display device 100 corresponding to the recognized gesture (S321).

After the control unit 170 measures a similarity between the recognized gesture and each of a plurality of gestures stored in the storage unit 140, when the measured similarity is greater than a reference similarity, the control unit 170 can determine the recognized gesture as a pre-stored gesture and can perform a function corresponding to the pre-stored gesture. For example, when a recognized user's hand gesture is a pre-registered hand gesture, the control unit 170 does not display a function guide and can perform a function corresponding to the pre-registered hand gesture immediately.

Figure 36:
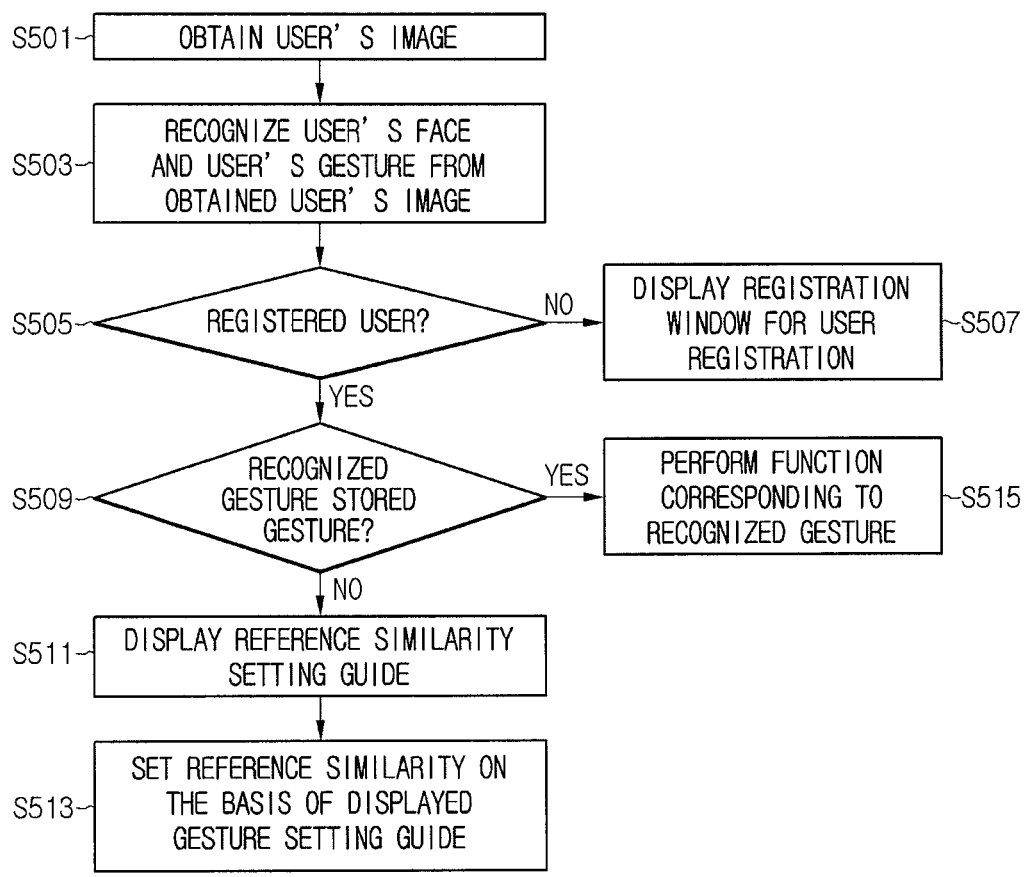
FIG. 36 is a flowchart illustrating an operating method of a display device according to an embodiment of the present invention.

Then, referring to FIG. 36, an operating method of a display device according to another embodiment of the present invention will be described. Hereinafter, in describing FIG. 36, contents overlapping with those of FIG. 27 are omitted. Referring to FIG. 36 the image acquisition unit 171 obtains a user's image (S501). The control unit 170 recognizes a user's face and a user's gesture from the obtained user's image (S503). The control unit 170 checks whether the user is a registered user through the recognized user's face (S505). If the control unit 170 confirms the user is not a registered user (No in S505), the control unit 170 displays a registration window for registering a new user through the display unit 180 (S507). Moreover, that the control unit 170 confirms the user is a registered user (Yes in S505), the control unit 170 checks whether the recognized user's gesture is a pre-stored gesture (S509).

If the control unit 170 confirms the recognized user's gesture is not a pre-stored gesture (No in S509), the control unit 170 displays a reference similarity setting guide through the display unit 180 (S511) and sets a reference similarity of a similar gesture based on the reference similarity setting guide (S513).

That is, when the recognized user's gesture is not a pre-stored gesture, the gesture setting guide can guide a user so as to set a reference similarity between the recognized user's gesture and a similar gesture, that is, a comparison target. For example, the control unit 170 can provide a similar gesture pattern similar to the recognized gesture and can display a reference similarity setting guide for setting a reference similarity on the provided similarity gesture pattern through the display unit 180.

The reference similarity setting guide can guide a user so as to set a reference similarity at the request of the user regardless of whether the recognized user's gesture is identical to a pre-stored gesture. The reference similarity setting guide will be described with reference to FIG. 37. In particular, FIG. 37 is a view illustrating a reference similarity setting guide according to an embodiment of the present invention.

Figure 37:
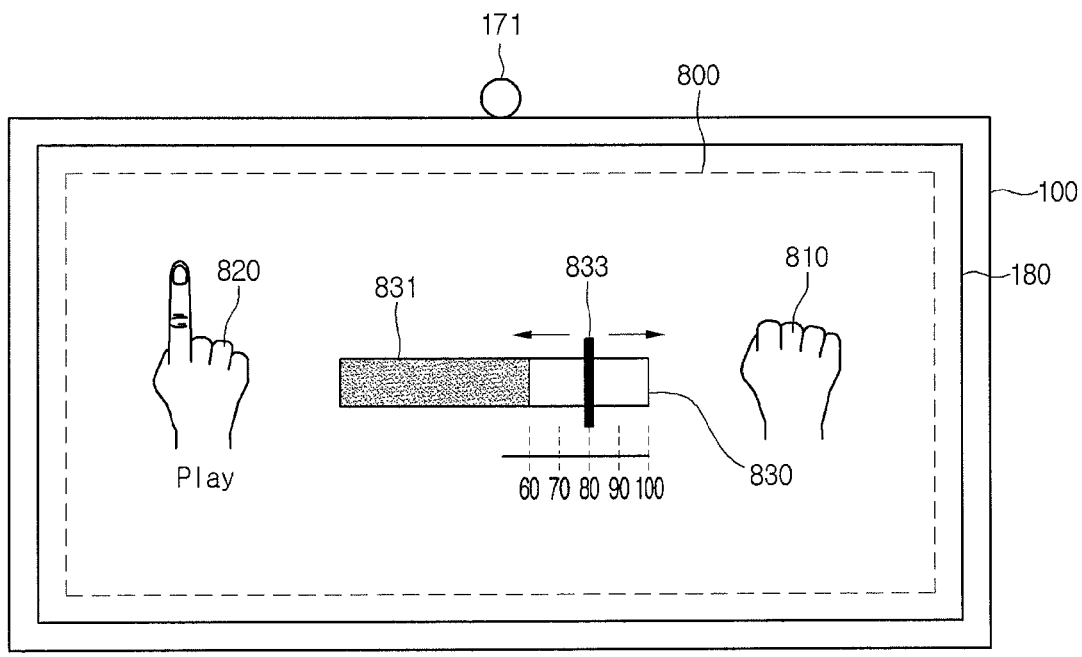
FIG. 37 is a view illustrating a reference similarity setting guide according to an embodiment of the present invention.

Referring to FIG. 37, the reference similarity setting guide 800 can include a recognized user's hand gesture 810, a similar hand gesture 820, and a similarity indicator 830. The recognized user's hand gesture 810 is a user's hand gesture captured by the image acquisition unit 171. The similar hand gesture 820 can be a hand gesture having the highest similarity to the recognized hand gesture 810 among pre-stored similar hand gesture patterns. However, this is just and a similar hand gesture can be another similar hand gesture other than the hand gesture having the highest similarity to the recognized hand gesture 810 among pre-stored similar hand gesture patterns.

The similarity indicator 830 can be an indicator representing how similar a recognized hand gesture 810 and a similar hand gesture 820 are. The similarity indicator 830 can include a similarity guide bar 831 and a reference indicator 833. The similarity guide bar 831 can represent the degree of similarity between the recognized hand gesture 810 and the similar hand gesture 820.

The reference indicator 833, as a predetermined reference similarity, can represent a minimum reference similarity necessary for recognizing the recognized hand gesture 810 as a pre-stored hand gesture. Referring to FIG. 37, a reference similarity indicated by a reference indicator is set to 80 and a measured similarity is indicated by 60.

According to an embodiment, the reference similarity can be set manually according to a user's input. That is, the control unit 170 can receive a user input for setting a reference similarity and can set the reference similarity according to the received user input. In more detail, the reference similarity corresponding to the similar hand gesture 820 can be set according to a user input changing a reference indicator to the left on the similarity guide bar 831.

However, the reference similarity can be set within a threshold range. The threshold range can have a size of 20 but this is just exemplary. The reason for setting the reference similarity within a threshold range is that when the reference similarity is set within an excessive range, a recognized hand gesture can correspond to a hand gesture's function that a user does not want.

When the reference similarity is set by adjusting the reference indicator 833 on the similarity guide bar 831, the control unit 170 can apply the set reference similarity to all pre-stored hand gestures. When a new user's hand gesture is recognized, the control unit 170 can compare the newly recognized user's hand gesture with each of pre-stored gestures according to a set reference similarity and can thus determine whether they are matched to each other.

Figure 38:
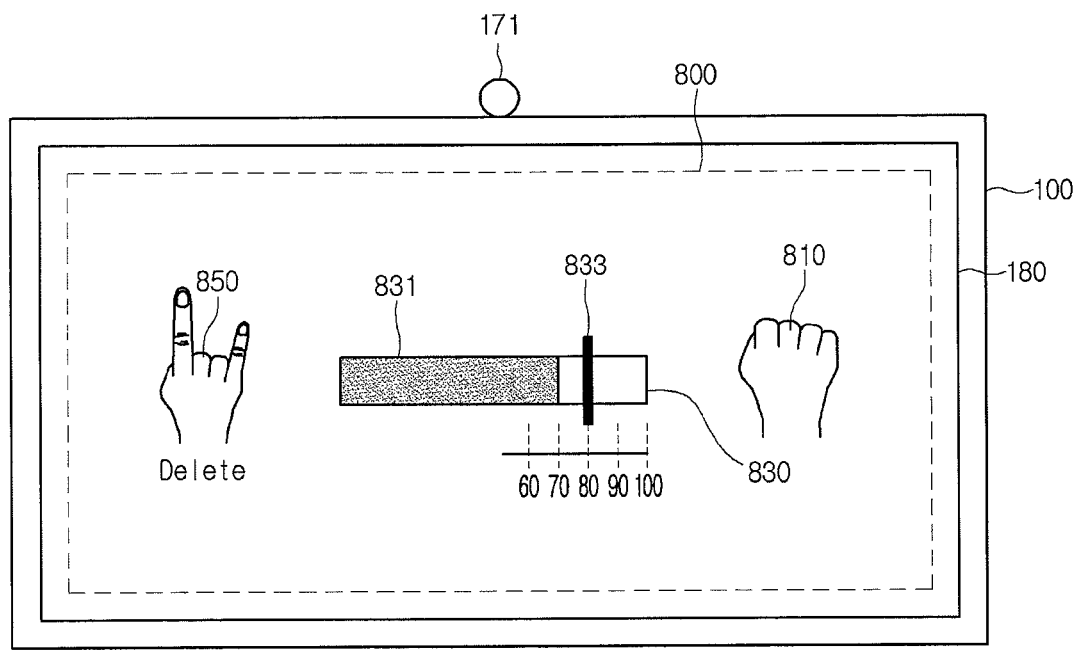
FIGS. 38 to 40 are views illustrating a process for setting a reference similarity automatically according to an embodiment of the present invention.
Figure 39:
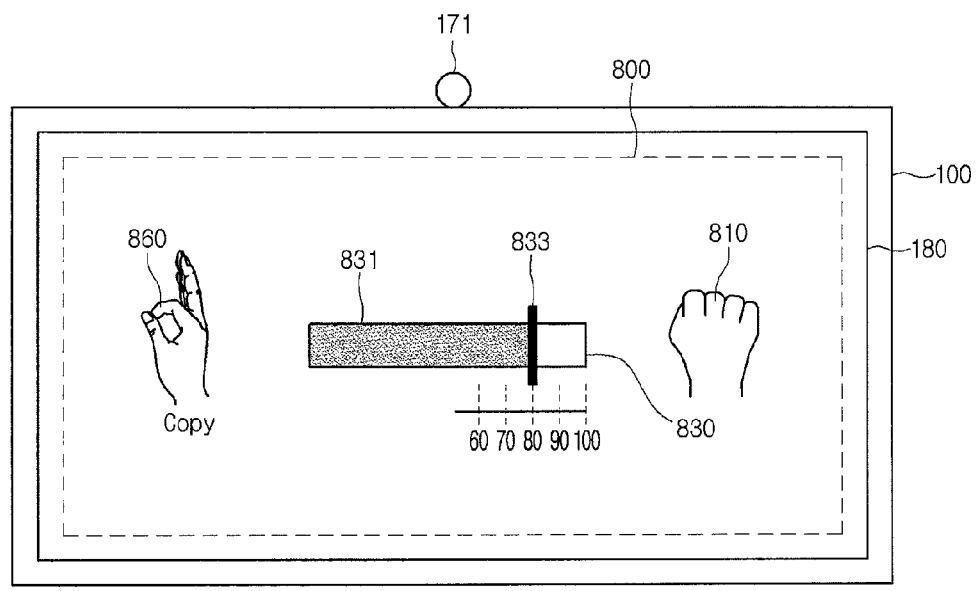
Figure 40:
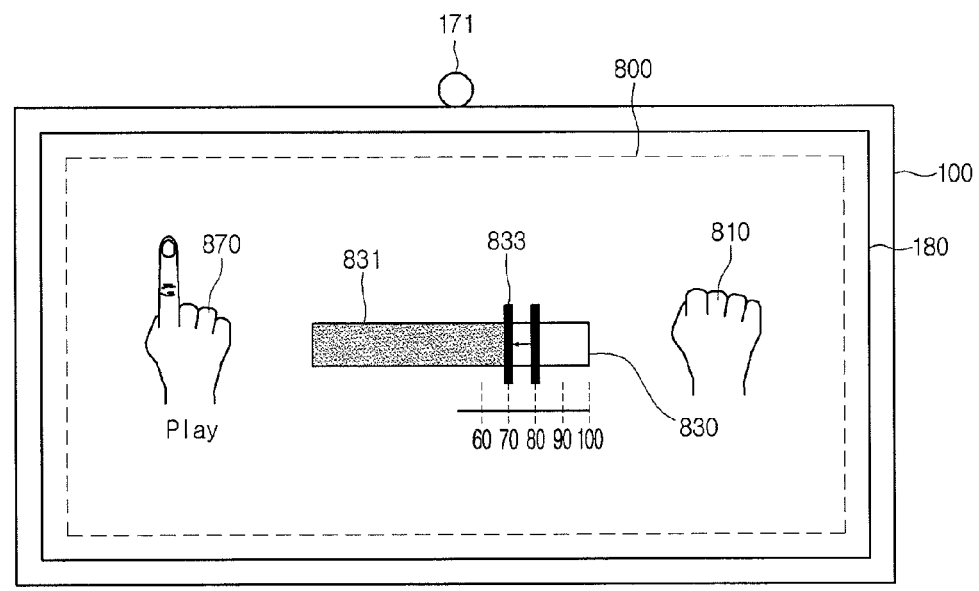

According to another embodiment, the reference similarity can be set automatically. An example in which the reference similarity is set automatically will be described with reference to FIGS. 38 to 40. In particular, FIGS. 38 to 40 are views illustrating a process for setting a reference similarity automatically according to an embodiment of the present invention. In order to describe a process for setting the reference similarity automatically, FIG. 37 is referred.

A similar gesture having a similar pattern to the recognized hand gesture 810 can vary each time a hand gesture is recognized. That is, as shown in FIGS. 37 and 39, a similar gesture similar to the recognized gesture 810 can vary each time the same hand gesture is recognized. For example, the reference similarity setting guide 800 can display a similar hand gesture 820 having a similarity of 60 to the recognized hand gesture 810 as shown in FIG. 37, can display a similar hand gesture 850 having a similarity of 70 as shown in FIG. 38, and can display a similar hand gesture 860 having a similarity of 80 as shown in FIG. 39.

The control unit 170 can measure a similarity between the recognized hand gesture 810 and each of the plurality of changing similar hand gestures 820, 850, and 860, and can calculate an average of the plurality of measured similarities. The control unit 170 can set 70, that is, an average of the plurality of measured similarities, as a reference similarity.

That is, as shown in FIG. 40, when the hand gesture 810 is recognized again, an existing reference similarity can be set to 70, that is, an average of the plurality of similarities, from 80. Herein, an example in which the number of a plurality of similar hand gestures is three is described but this is just exemplary.

Figure 41:
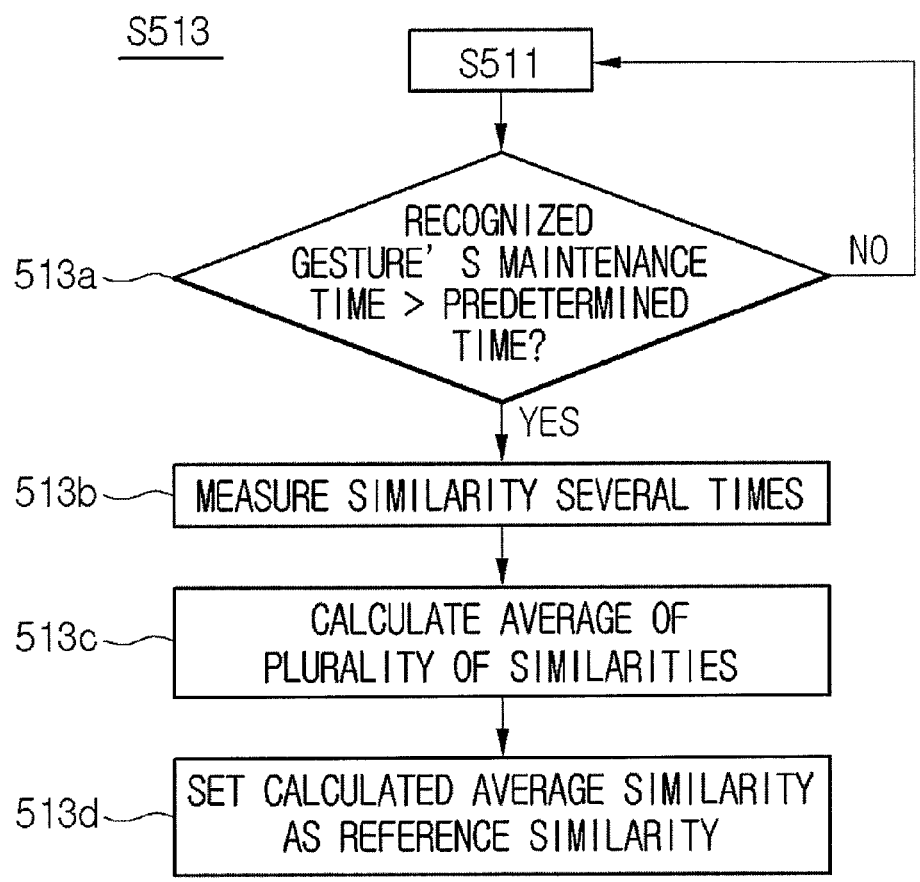
FIG. 41 is a flowchart illustrating a process for setting a reference similarity automatically by learning according to an embodiment of the present invention.

According to an embodiment of the present invention, even if a user's hand gesture is not recognized properly, a reference similarity is adjusted automatically, thereby providing a gesture recognition service proper for a user. According to another embodiment, the reference similarity can be set automatically by learning. This will be described with reference to FIG. 41. In particular, FIG. 41 is a flowchart illustrating a process for setting a reference similarity automatically by learning according to an embodiment of the present invention. FIG. 41 is a specified view of operation S513 shown in FIG. 2.

Referring to FIG. 41, the control unit 170 checks whether a time for maintaining the recognized user's gesture exceeds a predetermined time (S513a). If the time for maintaining the recognized user's gesture exceeds the predetermined time, a similarity between a gesture and a similar gesture is measured several times (S513b). Here, a similar gesture displayed on a reference similarity setting guide can be the same gesture for several times.

The control unit 170 calculates an average similarity of a plurality of measured similarities (S513c) and sets the calculated average similarity as a reference similarity (S513d). The control unit 170 can set a reference similarity within a threshold range. In more detail, the control unit 170 can compare the calculated average similarity with an existing similarity and when its difference exceeds a threshold range, can not set the calculated average similarity as the reference similarity and can then maintain the existing reference similarity.

Moreover, if the control unit 170 confirms the recognized user's gesture is a pre-stored gesture (S509), the control unit 170 performs a function of the display device 100 corresponding to the recognized gesture (S515.

According to various embodiments of the present invention, by displaying a hand gesture that a user takes and a similar gesture and registering a function corresponding to the displayed similar hand gesture in the hand gesture that the user performs, a gesture recognition service proper for each individual can be provided.

Additionally, according to various embodiments of the present invention, by manually or automatically setting a reference similarity between a hand gesture that a user takes and a similar gesture, a gesture recognition service optimized for a user can be provided.

According to an embodiment of the present invention, the above method can be implemented on a program recorded medium with processor readable code. Examples of the processor readable medium can include ROM, RAM, CD-ROM, magnetic tape, floppy disk, and optical data storage devices and also can be implemented in a form of a carrier wave (for example, transmission through internet).

In relation to the above-described display device, the configurations and methods of the above-described embodiments are applied without limitations and in order to provide various modifications, some or all of embodiments can be selectively combined and configured.

What is claimed is:

1. A method of controlling a display device, the method comprising:
   obtaining, via a camera of the display device, a user's image;
   recognizing, via a controller of the display device, a user's hand gesture from the obtained user's image; and
   if the recognized user's hand gesture does not match a pre-stored gesture, displaying, via a display of the display device, a function guide including different hand gestures different than the recognized user's hand gesture for guiding a user's selection for performing a function of the display device,
   wherein the different hand gestures include a plurality of similar hand gestures representing a gesture pattern similar to the recognized user's hand gesture,
   wherein the function guide comprises:
   an image of the recognized user's hand gesture; and
   a plurality of images of the different hand gestures,
   wherein the images of the different hand gestures are disposed around the image of the recognized user's hand gesture,
   wherein the method further comprises:
   recognizing, by using the obtained user's image, that the user's hand is moved toward a direction where one image corresponding to a different hand gesture among the plurality of images of the different hand gestures is disposed,
   selecting the image of a different hand gesture corresponding to the direction based on a recognition result, and
   performing a function of the display device corresponding to the selected image of the different hand gesture, and
   wherein the function of the display device represents a function related to an edition or a play of a media content.

2. The method according to claim 1, wherein each of the images of the different hand gestures is disposed at the top, bottom, left, and right of the image of the recognized user's hand gesture.

3. The method according to claim 2, wherein the function guide further comprises a plurality of function inducers disposed between the image of the recognized hand gesture and the images of each of the different hand gestures and inducing a user's selection to perform a function corresponding to each of the different hand gestures.

4. The method according to claim 3, wherein the function guide further comprises a plurality of similarity indicators representing a degree of similarity between each of the different hand gestures and the recognized user's hand gesture.

5. The method according to claim 4, further comprising:
   obtaining an input for selecting a specific different hand gesture from the different hand gestures; and
   performing a function of the display device corresponding to the selected specific different hand gesture.

6. The method according to claim 5, wherein the obtaining of the input for selecting the specific different hand gesture comprises obtaining an input for selecting the specific different hand gesture by detecting a movement direction of the user's hand.

7. The method according to claim 1, wherein the function guide comprises:
   images of a plurality of basic hand gestures representing a basic gesture pattern pre-specified or predetermined by the user; and
   text disposed at one side of each image of the basic hand gestures and representing a function of each of the plurality of basic hand gestures, and
   wherein each image of the basic hand gestures is disposed around the image of the recognized user's hand gesture.

8. The method according to claim 1, further comprising recognizing the user's face from the obtained user's image,
   wherein the displaying of the function guide comprises, when the recognized user's hand gesture is not the pre-stored gesture, displaying the function guide based on a position relationship of the recognized user's face and the recognized user's hand gesture.

9. The method according to claim 8, wherein when the recognized user's hand gesture is not the pre-stored gesture, the displaying of the function guide based on the position relationship of the recognized user's face and the recognized user's hand gesture comprises:
   detecting whether the recognized user's hand gesture is disposed at the right or left based on the user's face; and
   displaying the function guide based on a detection result, wherein the function guide comprises:
   images of a plurality of similar hand gestures representing a gesture pattern similar to the recognized user's hand gesture; and
   text disposed at one side of each image of the plurality of similar hand gestures and representing a function of each of the plurality of similar hand gestures, and
   wherein each image of the plurality of similar hand gestures is disposed around the recognized user's hand gesture.

10. The method according to claim 8, wherein when the recognized user's hand gesture is not the pre-stored gesture, the displaying of the function guide based on the position relationship of the recognized user's face and the recognized user's hand gesture comprises:
    detecting whether the recognized user's hand gesture is disposed at the right or left based on the user's face; and
    displaying the function guide based on a detection result, wherein the function guide comprises:
    images of a plurality of basic hand gestures representing a basic gesture pattern; and
    text disposed at one side of each of the plurality of basic hand gestures and representing a function of each of the plurality of basic hand gestures,
    wherein each image of the plurality of basic hand gestures is disposed around the recognized user's hand gesture.

11. A display device, comprising:
    a display;
    a memory configured to store gestures;
    a camera configured to obtain a user's image; and
    a controller configured to:
    recognize a user's hand gesture from the obtained user's image, and
    if the recognized user's hand gesture does not match a pre-stored gesture, display on the display a function guide including different hand gestures different than the recognized user's hand gesture for guiding a user's selection for performing a function of the display device,
    wherein the different hand gestures include a plurality of similar hand gestures representing a gesture pattern similar to the recognized user's hand gesture,
    wherein the function guide comprises:
    an image of the recognized user's hand gesture; and
    a plurality of images of the different hand gestures,
    wherein the images of the different hand gestures are disposed around the image of the recognized user's hand gesture,
    wherein the controller is further configured to:
    recognize, by using the obtained user's image, that the user's hand is moved toward a direction where one image corresponding to a different hand gesture among the plurality of images of the different hand gestures is disposed,
    select the image of a different hand gesture corresponding to the direction based on a recognition result, and
    perform a function of the display device corresponding to the selected image of the different hand gesture, and
    wherein the function of the display device represents a function related to an edition or a play of a media content.

12. The display device according to claim 11, wherein each of the images of the different hand gestures is disposed at the top, bottom, left, and right of the image of the recognized user's hand gesture.

13. The display device according to claim 12, wherein the function guide further comprises a plurality of function inducers disposed between the image of the recognized hand gesture and the images of each of the different hand gestures and inducing a user's selection to perform a function corresponding to each of the different hand gestures.

14. The display device according to claim 13, wherein the function guide further comprises a plurality of similarity indicators representing a degree of similarity between each of the different hand gestures and the recognized user's hand gesture.

15. The display device according to claim 14, wherein the controller is further configured to:
    obtain an input for selecting a specific different hand gesture from the different hand gestures, and
    perform a function of the display device corresponding to the selected specific different hand gesture.

16. The display device according to claim 15, wherein the controller is further configured to obtain the input for selecting the specific different hand gesture by detecting a movement direction of the user's hand.

17. The display device according to claim 11, wherein the function guide comprises:
    images of a plurality of basic hand gestures representing a basic gesture pattern pre-specified or predetermined by the user; and
    text disposed at one side of each image of the basic hand gestures and representing a function of each of the plurality of basic hand gestures, and
    wherein each image of the basic hand gestures is disposed around the image of the recognized user's hand gesture.

18. The display device according to claim 11, wherein the controller is further configured to:
    recognize the user's face from the obtained user's image, and
    when the recognized user's hand gesture is not the pre-stored gesture, display on the display the function guide based on a position relationship of the recognized user's face and the recognized user's hand gesture.

19. The method according to claim 1, wherein the plurality of similar hand gestures are displayed on the function guide if a similarity between the recognized gesture and each of a plurality of gestures stored in the memory is less than a reference similarity.

20. The display device according to claim 11, wherein the plurality of similar hand gestures are displayed on the function guide if a similarity between the recognized gesture and each of a plurality of gestures stored in the memory is less than a reference similarity.

* * * * *